United States Patent
Moon et al.

(10) Patent No.: US 12,506,951 B2
(45) Date of Patent: *Dec. 23, 2025

(54) ELECTRONIC DEVICE INCLUDING CAMERA AND METHOD OF OPERATING THE SAME

(71) Applicant: Samsung Electronics Co., Ltd., Gyeonggi-do (KR)

(72) Inventors: Sunho Moon, Gyeonggi-do (KR); Yeonjong Bong, Gyeonggi-do (KR); Ramakrishnan Srinivasakannan, Bangalore (IN); Gaurav Kumar Jain, Bangalore (IN); Girish Kulkarni, Bangalore (IN); Karthikeyan Somanathan, Bangalore (IN); Sachin Dev, Bangalore (IN); Sudha Velusamy, Bangalore (IN); Uison Yoon, Gyeonggi-do (KR); Jehan Yoon, Gyeonggi-do (KR); Cheolyong Jeon, Gyeonggi-do (KR); Kihuk Lee, Gyeonggi-do (KR)

(73) Assignee: Samsung Electronics Co., Ltd. (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/673,428

(22) Filed: May 24, 2024

(65) Prior Publication Data
US 2024/0314424 A1 Sep. 19, 2024

Related U.S. Application Data

(63) Continuation of application No. 17/161,131, filed on Jan. 28, 2021, now Pat. No. 11,997,378.

(30) Foreign Application Priority Data

Jan. 31, 2020 (IN) .............................. 202021004382
Feb. 10, 2020 (KR) ........................ 10-2020-0015771

(51) Int. Cl.
H04N 23/63 (2023.01)

(52) U.S. Cl.
CPC ......... H04N 23/632 (2023.01); H04N 23/633 (2023.01)

(58) Field of Classification Search
None
See application file for complete search history.

(56) References Cited

U.S. PATENT DOCUMENTS

| 8,289,400 B2 | 10/2012 | Brunner et al. |
| 8,681,234 B2 | 3/2014 | Harris |

(Continued)

FOREIGN PATENT DOCUMENTS

| CN | 106453864 | 2/2017 |
| CN | 108495045 | 9/2018 |

(Continued)

OTHER PUBLICATIONS

Chinese Office Action dated Jun. 27, 2024 issued in counterpart application No. 202080095348.7, 19 pages.

(Continued)

*Primary Examiner* — Cynthia Segura
(74) *Attorney, Agent, or Firm* — The Farrell Law Firm, P.C.

(57) ABSTRACT

A device and method are provided for providing a function related to a camera in an electronic device. A method includes acquiring, via a first camera of the electronic device, a plurality of first images; acquiring, via a second camera of the electronic device, one or more second images; generating a plurality of image contents based on at least one of the plurality of first images or the one or more second images; and outputting the plurality of image contents at respective regions of a display of the electronic device.

14 Claims, 19 Drawing Sheets

(56) References Cited

U.S. PATENT DOCUMENTS

| | | | |
|---|---|---|---|
| 8,908,987 | B1 | 12/2014 | Krishnaswamy et al. |
| 9,041,826 | B2 | 5/2015 | Jung |
| 9,699,347 | B2 | 7/2017 | Sang |
| 9,843,731 | B2 | 12/2017 | Shimosato |
| 9,860,451 | B2 | 1/2018 | Penha et al. |
| 10,958,853 | B2 | 3/2021 | Kwak |
| 11,743,583 | B2 | 8/2023 | Nishimura |
| 11,997,378 | B2 * | 5/2024 | Moon .................. H04N 23/633 |
| 2008/0309778 | A1 | 12/2008 | Tabatabai |
| 2009/0309988 | A1 | 12/2009 | Kubo |
| 2010/0231735 | A1 | 9/2010 | Burian |
| 2011/0169921 | A1 | 7/2011 | Lee |
| 2012/0314123 | A1 | 12/2012 | Lee |
| 2013/0242124 | A1 | 9/2013 | Mukai |
| 2013/0258127 | A1 | 10/2013 | Jang |
| 2014/0354848 | A1 | 12/2014 | Kim et al. |
| 2015/0062288 | A1 | 3/2015 | Lee et al. |
| 2015/0281567 | A1 | 10/2015 | Tsui et al. |
| 2016/0006938 | A1 | 1/2016 | Haruki et al. |
| 2016/0027476 | A1 * | 1/2016 | Shimokawa ........... H04N 23/63 386/241 |
| 2016/0117829 | A1 | 4/2016 | Yoon |
| 2016/0284095 | A1 | 9/2016 | Chalom et al. |
| 2017/0034449 | A1 | 2/2017 | Eum et al. |
| 2017/0244897 | A1 | 8/2017 | Jung et al. |
| 2018/0070023 | A1 | 3/2018 | Oh |
| 2018/0077358 | A1 * | 3/2018 | Shintani ............... H04N 23/667 |
| 2018/0160108 | A1 | 6/2018 | Park et al. |
| 2018/0227506 | A1 * | 8/2018 | Lee ....................... H04N 5/2624 |
| 2018/0276473 | A1 | 9/2018 | Kim et al. |
| 2019/0132570 | A1 | 5/2019 | Chen |
| 2019/0281206 | A1 | 9/2019 | Lee et al. |
| 2020/0007733 | A1 | 1/2020 | Shimizu |
| 2020/0186728 | A1 | 6/2020 | Pena |
| 2020/0244884 | A1 | 7/2020 | Baek |
| 2021/0051276 | A1 | 2/2021 | Park |
| 2021/0152739 | A1 * | 5/2021 | Lu ......................... H04N 5/783 |
| 2022/0084282 | A1 | 3/2022 | Araki |
| 2022/0201203 | A1 | 6/2022 | Lim |

FOREIGN PATENT DOCUMENTS

| | | |
|---|---|---|
| CN | 108664829 | 10/2018 |
| KR | 1020080079454 | 9/2008 |

OTHER PUBLICATIONS

Google AI Blog: "Top Shot on Pixel 3" Posted by Li Zhang and Wei (Alex) Hong, Software Engineers https://ai.googleblog.com/2018/12/top-shot-on-pixel-3.html.
International Search Report dated Mar. 29, 2021 issued in counterpart application No. PCT/KR2020/018537, 3 pages.
European Search Report dated Dec. 8, 2022 issued in counterpart application No. 20916692.5-1224, 9 pages.
Chinese Office Action dated Dec. 21, 2023 issued in counterpart application No. 202080095348.7, 16 pages.
Chinese Office Action dated Oct. 22, 2024 issued in counterpart application No. 202080095348.7, 8 pages.
Korean Office Action dated Nov. 4, 2024 issued in counterpart application No. 10-2020-0015771, 12 pages.
European Search Report dated Nov. 20, 2024 issued in counterpart application No. 24193064.3-1218, 10 pages.
Indian Examination Report dated Oct. 24, 2025 issued in counterpart application No. 202347026073, 9 pages.

* cited by examiner

820

ELECTRONIC DEVICE INCLUDING CAMERA AND METHOD OF OPERATING THE SAME

CROSS-REFERENCE TO RELATED APPLICATION(S)

This application is a continuation of U.S. application Ser. No. 17/161,131, which was filed in the U.S. Patent and Trademark Office on Jan. 28, 2021, and claims priority under 35 U.S.C. § 119(a) to Indian Provisional Application Ser. No. 202021004382, which was filed in the Indian Intellectual Property Office on Jan. 31, 2020, and to Korean Application Serial No. 10-2020-0015771, which was filed in the Korean Intellectual Property Office on Feb. 10, 2020, the entire content of each of which is incorporated herein by reference.

BACKGROUND

1. Field

The disclosure relates generally to an electronic device including a camera and a method of operating the same.

2. Description of Related Art

With the development of information and communication technology and semiconductor technology, electronic devices provide various functions, such as functions related to voice calls, messages, broadcasting, wireless Internet, cameras, and music playback.

An electronic device may acquire image content desired by a user using a camera (e.g., an image sensor). The image content may include a still image and/or a moving image.

An electronic device may acquire image content using a camera included therein based on a user input related to photographing. When receiving a user input related to a still image, the electronic device may acquire a still image through the camera corresponding to the user input. When receiving a user input related to a moving image, the electronic device may acquire a moving image through the camera corresponding to the user input.

In order to obtain various types of image content for the same subject, the user of the electronic device may experience inconvenience of performing multiple inputs related to different types of image content (e.g., still images or moving images). In addition, the electronic device may not be able to acquire various types of image content through the camera at one time.

SUMMARY

The disclosure is provided to address at least the problems and/or disadvantages described above and to provide at least the advantages described below.

An aspect of the disclosure is to provide an apparatus and method for providing various types of image content based on a single user input related to photographing in an electronic device.

In accordance with an aspect of the disclosure, an electronic device is provided, which includes a display; a first camera; a second camera; a processor; and memory storing instructions which, when executed by the processor, cause the electronic device to acquire, via the first camera, a plurality of first images, acquire, via the second camera, one or more second images, generate a plurality of image contents based on at least one of the plurality of first images or the one or more second images, and output the plurality of image contents at respective regions of the display.

In accordance with an aspect of the disclosure, a method is provided for operating an electronic device. The method includes acquiring, via a first camera of the electronic device, a plurality of first images; acquiring, via a second camera of the electronic device, one or more second images; generating a plurality of image contents based on at least one of the plurality of first images or the one or more second images; and outputting the plurality of image contents at respective regions of a display of the electronic device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Hereinafter, various embodiments of the disclosure will be described in detail with reference to the accompanying drawings.

Figure 1:
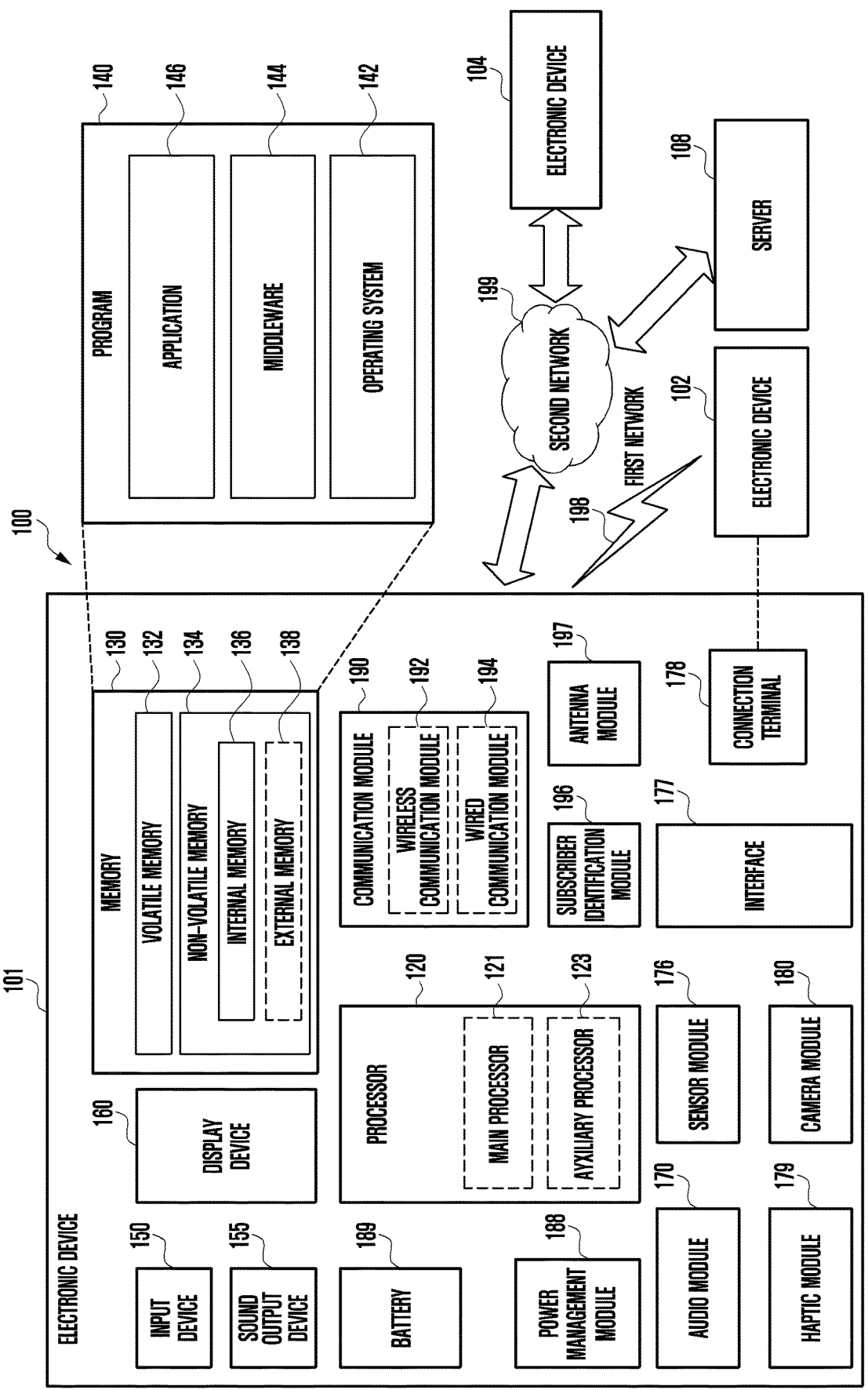
FIG. 1 illustrates an electronic device in a network environment according to an embodiment.

FIG. 1 illustrates an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or IR data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments of the disclosure, each component (e.g., a module or a program) of the above-described components may include a single entity or multiple entities. According to certain embodiments of the disclosure, one or more of the above-described components may be omitted, or one or more other components may be added. Alternatively or additionally, a plurality of components (e.g., modules or programs) may be integrated into a single component. In such a case, according to certain embodiments of the disclosure, the integrated component may perform one or more functions of each of the plurality of components in the same or similar manner as they are performed by a corresponding one of the plurality of components before the integration. According to certain embodiments of the disclosure, operations performed by the module, the program, or another component may be carried out sequentially, in parallel, repeatedly, or heuristically, or one or more of the operations may be executed in a different order or omitted, or one or more other operations may be added.

Figure 2A:
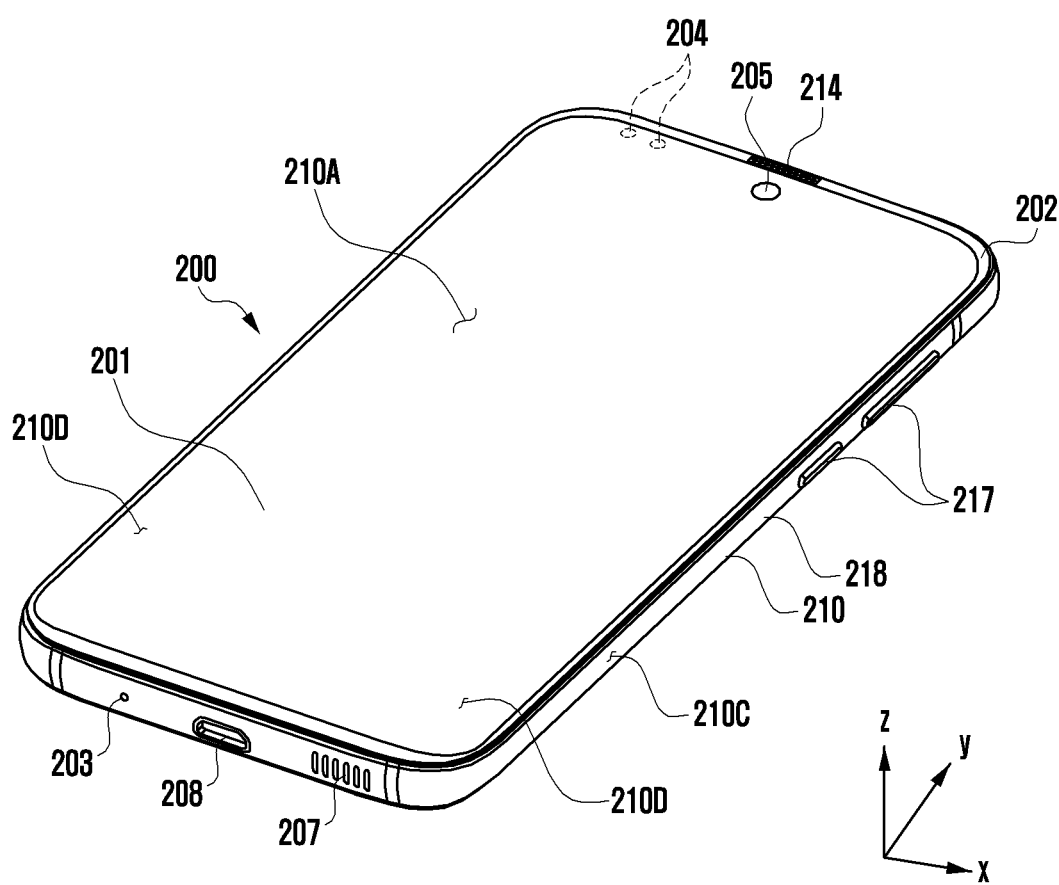
FIG. 2A illustrates a front side of an electronic device according to an embodiment.
Figure 2B:
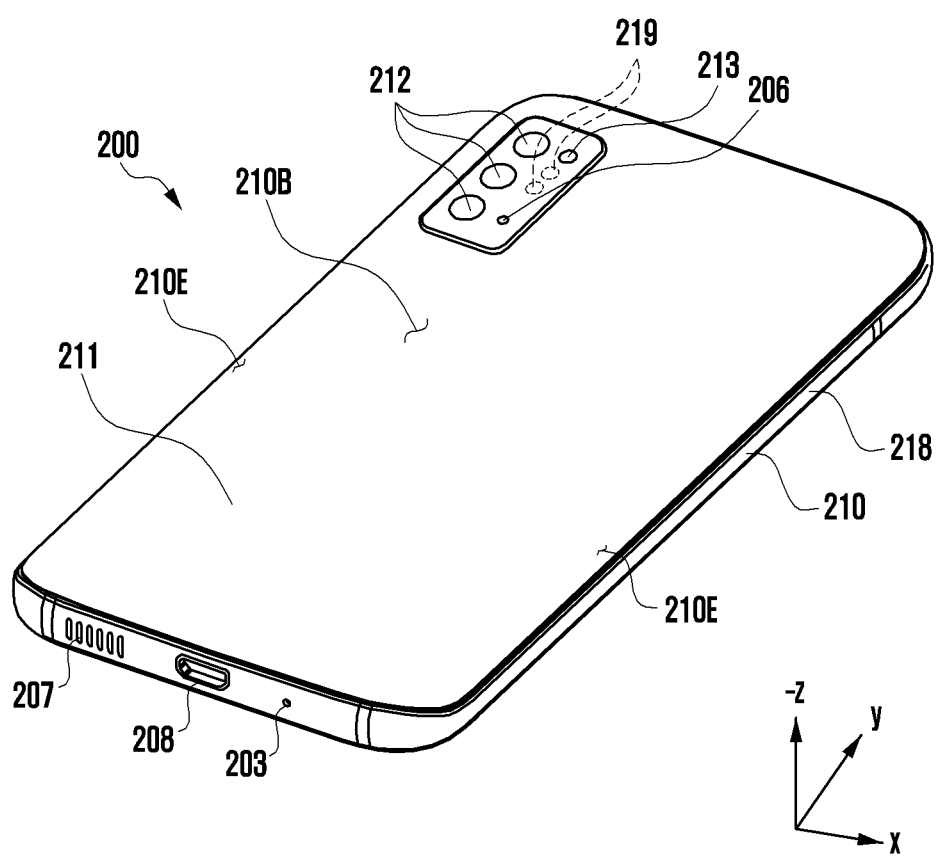
FIG. 2B illustrates a rear side of an electronic device according to an embodiment.

FIG. 2A illustrates a front side of an electronic device according to an embodiment. FIG. 2B illustrates a rear side of an electronic device according to an embodiment. For example, the electronic device 200 of FIGS. 2A and 2B may be at least partially similar to the electronic device 100 of FIG. 1, or may include other embodiments of the electronic device.

Referring to FIGS. 2A and 2B, the electronic device 200 includes a housing 210, which includes a first surface (or a front surface) 210A, a second surface (or a rear surface) 210B, and a side surface 210C surrounding the space between the first surface 210A and the second surface 210B. The term "housing" may mean a structure forming some of the first surface 210A, the second surface 210B, and the side surface 210C in FIG. 2A. At least a portion of the first surface 210A may be formed by a substantially transparent front plate 202 (e.g., a glass plate or a polymer plate including various coating layers). The second surface 210B may be formed by a substantially opaque rear plate 211. The rear plate 211 may be formed of coated or colored glass, ceramic, polymer, metal (e.g., aluminum, stainless steel (STS), or magnesium), or a combination of two or more of these materials. The side surface 210C may be formed by a side bezel structure (or a "side member") 218 coupled to the front plate 202 and the rear plate 211 and including metal and/or polymer. The rear plate 211 and the side bezel structure 218 may be integrally formed, and may include the same material (e.g., a metal material such as aluminum).

The front plate 202 includes first regions 210D, which are bent from the first surface 210A toward the rear plate 211 and extend seamlessly, at the long opposite side edges thereof. The rear plate 211 includes, at the long opposite side edges thereof, second regions 210E, which are bent from the second surface 210B toward the front plate 202 and extend seamlessly. The front plate 202 or the rear plate 211 may include only one of the first regions 210D or the second regions 210E. Alternatively, the front plate 202 may not include the first regions 210D and the second regions 210E, but may include only a flat plane disposed parallel to the second surface 210B. When viewed from a side of the electronic device 200, the side bezel structure 218 may have a first thickness (or width) on the side surface portions where the first regions 210D or the second regions 210E are not included, and may have a second thickness (or width), which is smaller than the first thickness, on the side surface portions where the first regions 210D or the second regions 210E are included.

The electronic device 200 includes a display 201, an input device 203 or 206, a sound output device 207 or 214, a sensor module 204 or 219, a camera module 205, 212, or 213, a key input device 217, an indicator, or a connector 208. In the electronic device 200, at least one of the components ((e.g., the key input device 217 or the indicator) may be omitted, or other components may be additionally included.

The display 201 may be exposed through a substantial portion of the front plate 202. Alternatively, at least a portion of the display 201 may be exposed through the front plate 202 forming the first surface 210A and the first regions 210D of the side surfaces 210C. The display 201 may be coupled to or disposed adjacent to a touch-sensing circuit, a pressure sensor capable of measuring touch intensity (pressure), and/or a digitizer configured to detect a magnetic-field-type stylus pen. At least some of sensor modules 204 or 219 and/or at least some of key input devices 217 may be disposed in the first regions 210D and/or the second regions 210E.

The input devices 203 and 206 may include microphones 203 and 206. A first input device 203 may include a plurality of microphones 203 arranged to sense the direction of sound. A second input device 206 may be disposed on the second surface 210B so as to interlock with the second camera device 212.

The sound output devices 207 and 214 may include speakers 207 and 214. The speakers 207 and 214 may include an external speaker 207 and a phone call receiver 214. The microphones 203 and 206, the speakers 207 and 214, and the connector 208 are disposed in the space in the electronic device 200, and may be exposed to the external environment through one or more holes formed in the housing 210. The holes formed in the housing 210 may be commonly used for the microphones 203 and 206 and the speakers 207 and 214. The sound output devices 207 and 214 may include a speaker that operates without a separate speaker hole (e.g., a piezo speaker).

The sensor modules 204 and 219 may generate an electrical signal or a data value corresponding to the internal operating state or an external environmental state of the electronic device 200. The sensor modules 204 and 219 may include a first sensor module 204 (e.g., a proximity sensor) and/or a second sensor module (e.g., a fingerprint sensor) disposed on the first surface 210A of the housing 210, and/or a third sensor module 219 disposed on the second surface 210B of the housing 210. The fingerprint sensor may be disposed on the first surface 210A of the housing 210 (e.g., a home key button), a region in the second surface 210B, or under the display 201. The electronic device 200 may include other sensor modules, such as a gesture sensor, a gyro sensor, an atmospheric pressure sensor, a magnetic sensor, an acceleration sensor, a grip sensor, a color sensor, an IR sensor, a biometric sensor, a temperature sensor, a humidity sensor, or an illuminance sensor.

The camera modules 205, 212, and 213 may include a first camera device 205 disposed on the first surface 210A of the electronic device 200, a second camera device 212 disposed on the second surface 210B, and/or a flash 213. The camera modules 205 and 212 may include one or more lenses, an image sensor, and/or an ISP. The flash 213 may include a light-emitting diode or a xenon lamp. Two or more lenses (e.g., a wide-angle lens, a super-wide-angle lens, and a telephoto lens) and image sensors may be disposed on one surface of the electronic device 200.

The key input devices 217 may be disposed on the side face 210C of the housing 210. Alternatively, the electronic device 200 omit some or all of the key input devices 217, and a key input device 217 not included in the electronic device 200 may be implemented in another form, such as a soft key on the display 201. A key input device 217 may be implemented using a pressure sensor included in the display 201.

The indicator may be disposed on the first surface 210A of the housing 210. The indicator may provide the status information about the electronic device 200 in an optical form. The indicator may provide a light source that is interlocked with the operation of the camera module 205. The indicator may include a light emitting diode (LED), an IR LED, and a xenon lamp.

The connector holes 208 may include a first connector hole 208 capable of accommodating a connector (e.g., a USB connector) for transmitting/receiving power and/or data to or from an external electronic device. The electronic device 200 may include a second connector hole (or an earphone jack) capable of accommodating a connector for transmitting/receiving an audio signal with respect to an external electronic device.

Some of the camera modules 205 and 212, some of the sensor modules 204 and 219, and/or the indicator may be disposed to be exposed through the display 201. For example, the first camera device 205, the first sensor module 204, and/or the indicator may be disposed in the internal space in the electronic device 200 to be in contact with the external environment through a through hole perforated in the display 201 up to the front plate 202.

Alternatively, the first sensor module 204 and/or the first camera device 205 may be disposed in the internal space in the electronic device so as to perform the functions thereof without being visually exposed through the front plate 202. In this case, a through hole may not be necessary in the region in which the display 201 faces the first sensor module 204 and/or the first camera device 205.

Figure 2C:
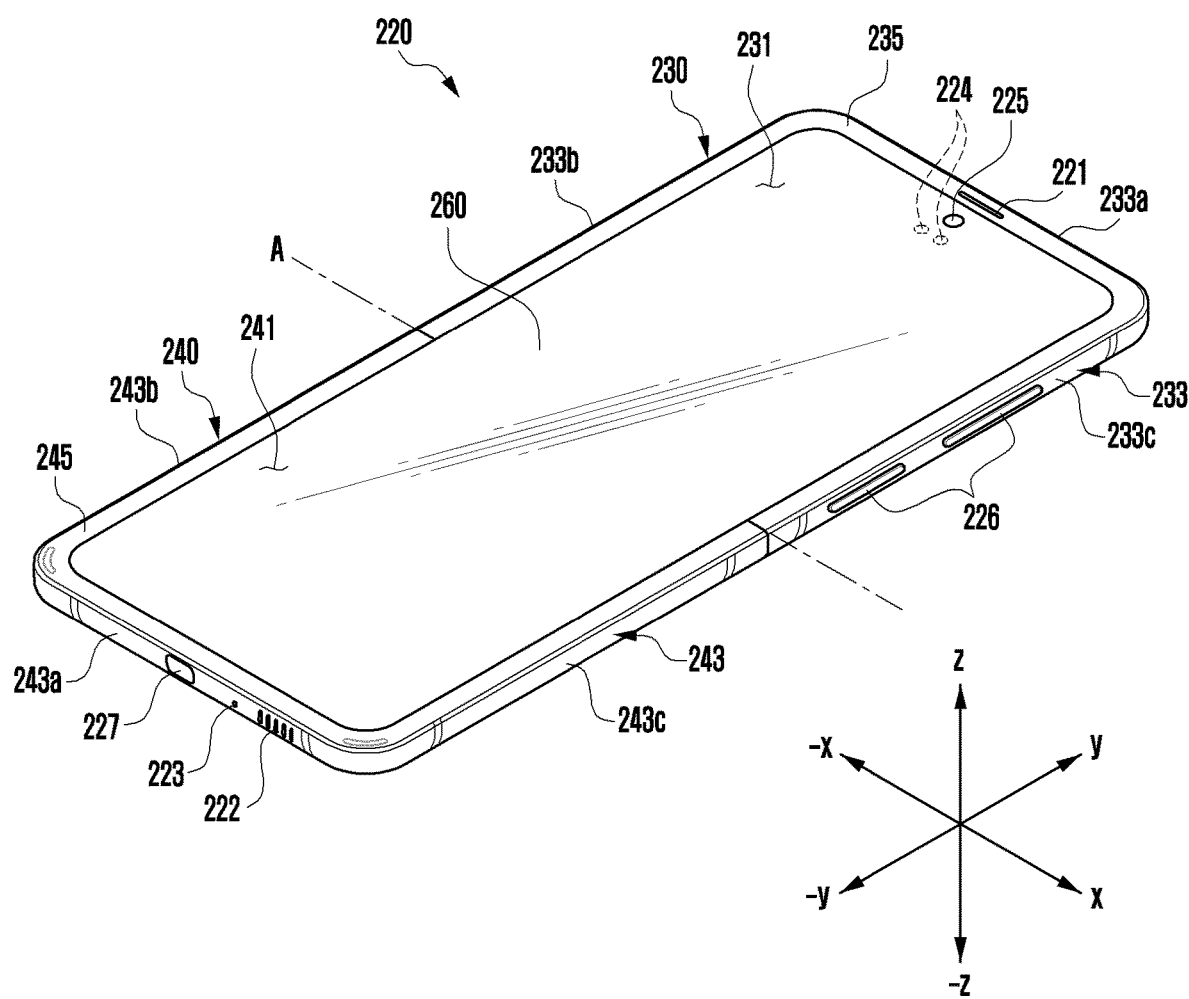
FIG. 2C illustrates an electronic device in an unfolded state according to an embodiment.
Figure 2D:
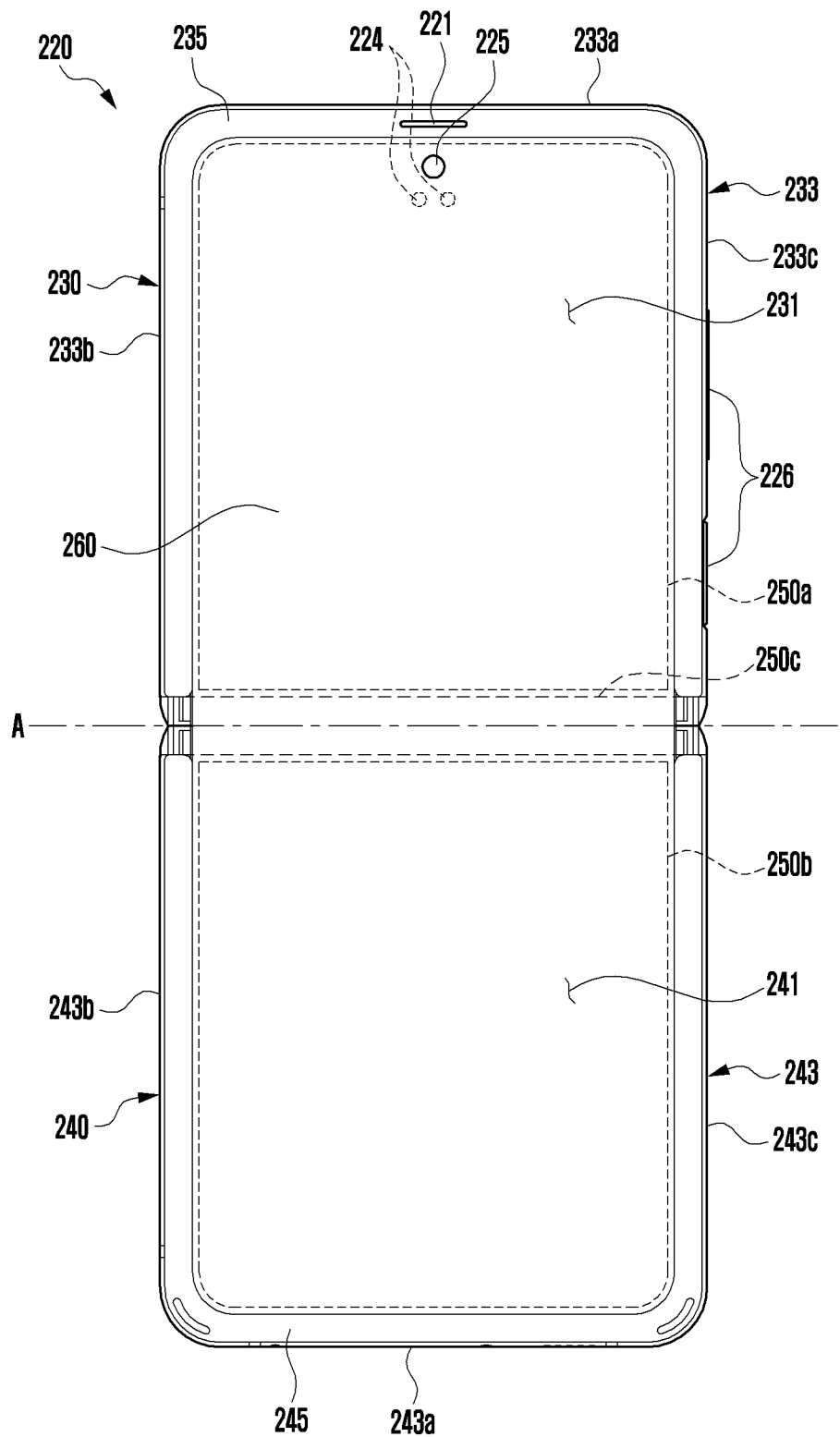
FIG. 2D illustrates a front side of an electronic device in an unfolded state according to an embodiment.
Figure 2E:
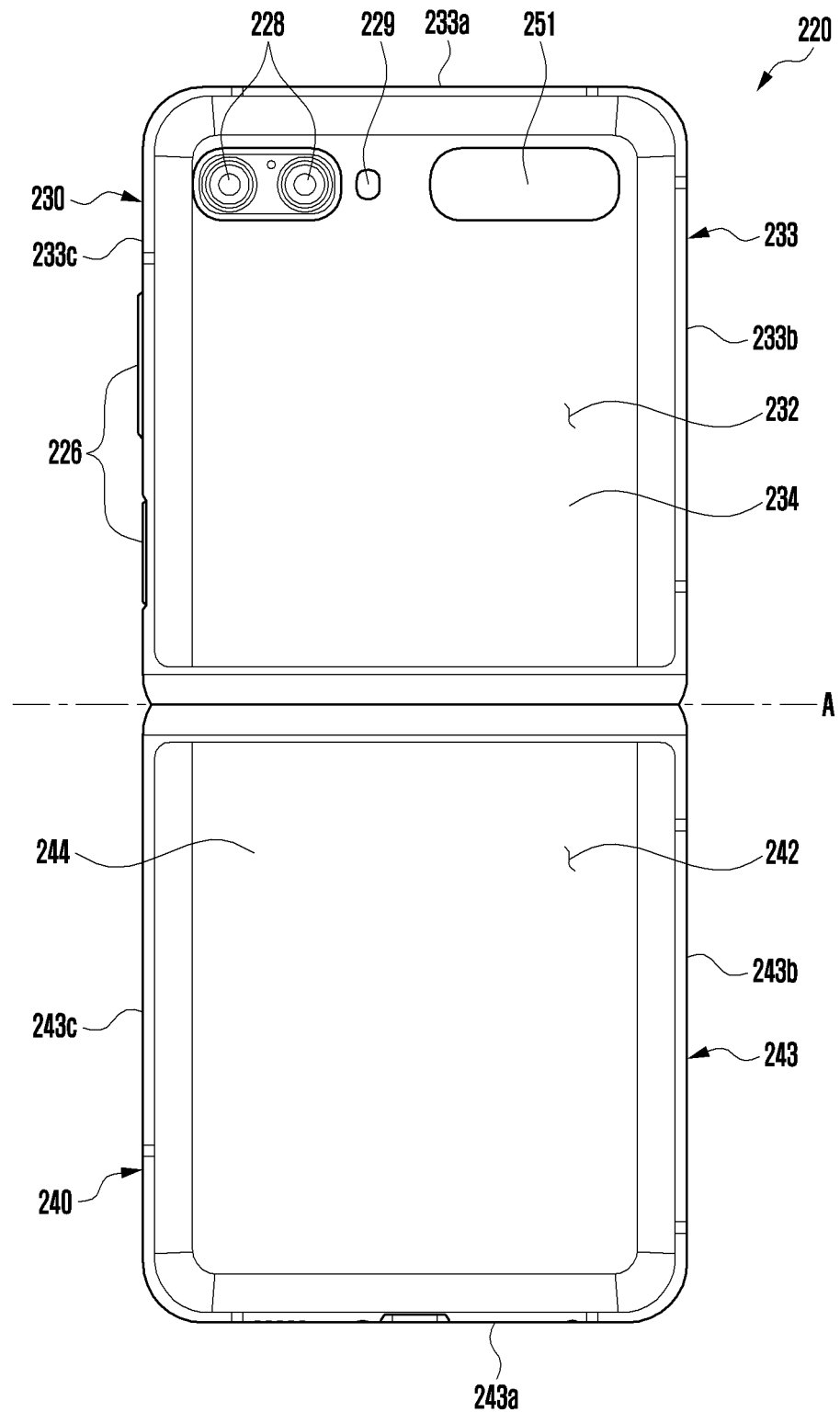
FIG. 2E illustrates a rear side of an electronic device in an unfolded state according to an embodiment.

FIG. 2C illustrates an electronic device in an unfolded or flat state according to an embodiment. FIG. 2D illustrates a front side of an electronic device in an unfolded state according to an embodiment. FIG. 2E illustrates a rear side of an electronic device in an unfolded state according to an embodiment. For example, the electronic device 220 in FIGS. 2C to 2E may be at least partially similar to the electronic device 220 of FIG. 1, or may include other embodiments of the electronic device.

Referring to FIGS. 2C to 2E, the electronic device 220 includes a pair of housings 230 and 240 (e.g., foldable housings), which are rotatably coupled to each other to be folded about a hinge module. The electronic device 220 includes a flexible display 260 (e.g., a foldable display) disposed in a region formed by the pair of housings 230 and 240. The first housing 230 and the second housing 240 are disposed on opposite sides about a folding axis (axis A), and may have substantially symmetrical shapes with respect to the folding axis (axis A). The first housing 230 and the second housing 240 may form an angle or a distance therebetween, which may be variable depending on whether the electronic device 220 is in an unfolded or flat state, in a folded state, or in an intermediate state.

The housings 230 and 240 may include a first housing 230 (e.g., a first housing structure) coupled to the hinge module and a second housing 240 (e.g., the second housing structure) coupled to the hinge module. The first housing 230 includes, in the unfolded state, a first surface 231 facing a first direction (e.g., front direction) (+z axis direction) and a second surface 232 facing a second direction (e.g., rear direction) (−z axis direction) opposite the first surface 231. The second housing 240 includes, in the unfolded state, a third surface 241 facing the first direction (+z axis direction) and a fourth surface 242 facing the second direction (−z axis direction). The electronic device 220 may be operated such that, in the unfolded state, the first surface 231 of the first housing 230 and the third surface 241 of the second housing 240 face substantially the same direction, i.e., the first direction (+z axis direction) and in the folded state, the first surface 231 and the third surface 241 face each other. The electronic device 220 may be operated such that, in the unfolded state, the second surface 232 of the first housing 230 and the fourth surface 242 of the second housing 240 face substantially the same direction, i.e., the second direction (−z axis direction) and in the folded state, the second surface 232 and the fourth surface 242 face opposite directions. In the folded state, the second surface 232 may face the first direction (+z axis direction), and the fourth surface 242 may face the second direction (−z axis direction).

The electronic device 220 may be operated such that, in the unfolded state, the first surface 231 of the first housing 230 and the third surface 241 of the second housing 240 face substantially the same direction, i.e., the first direction (+z axis direction) and in the folded state, the first surface 231 and the third surface 241 face opposite directions. The electronic device 220 may be operated such that, in the unfolded state, the second surface 232 of the first housing 230 and the fourth surface 242 of the second housing 240 face substantially the same direction, i.e., the second direction (−z axis direction) and in the folded state, the second surface 232 and the fourth surface 242 face each other.

The first housing 230 includes a first side frame 233 forming at least a portion of the exterior of the electronic device 220 and a first rear cover 234 coupled to the first side frame 233 and forming at least a portion of the second surface 232 of the electronic device 220. The first side frame 233 includes a first side surface 233a, a second side surface 233b extending from one end of the first side surface 233a, and a third side face 233c extending from the other end of the first side surface 233a. The first side frame 233 may be formed in a rectangular (e.g., square or rectangular) shape through the first side 233a, the second side 233b, and the third side 233c.

The second housing 240 includes a second side frame 243 forming at least a portion of the exterior of the electronic device 220 and a second rear cover 244 coupled to the second side frame 243 and forming at least a portion of the fourth surface 242 of the electronic device 220. The second side frame 243 includes a fourth side surface 243a, a fifth side surface 243b extending from one end of the fourth side surface 243a, and a sixth side face 243c extending from the other end of the fourth side surface 233a. The second side frame 243 may be formed in a rectangular shape through the fourth side 243a, the fifth side 243b, and the sixth side 243c.

The housing structures 230 and 240 are not limited to the illustrated shape and assembly, but may be implemented by other shapes or other combinations and/or assemblies of components. For example, the first side frame 233 and the first rear cover 234 may be integrally formed, and the second side frame 243 and the second rear cover 244 may be integrally formed.

When the electronic device 220 is in the unfolded state, the second side surface 233b of the first side frame 233 and the fifth side surface 243b of the second side frame 243 may be connected to each other without a gap. When the electronic device 220 is in the unfolded state, the third side surface 233c of the first side frame 233 and the sixth side surface 243c of the second side frame 243 may be connected to each other without a gap. The electronic device 220 may be configured such that, in the unfolded state, the total length of the second side surface 233b and the fifth side surface 243b is longer than the first side surface 233a and/or the fourth side surface 243a. In addition, the electronic device 220 may be configured such that the total length of the third side surface 233c and the sixth side surface 243c is longer than the first side surface 233a and/or the fourth side surface 243a.

The flexible display 260 may be disposed to extend from the first surface 231 of the first housing 230 to at least a portion of the third surface 241 of the second housing 240 across the hinge module. The flexible display 260 includes a first flat portion 250a substantially corresponding to the first surface 231, a second flat portion 250b corresponding to the second surface 241, and a bendable portion 250c interconnecting the first flat portion 250a and the second flat portion 250b and corresponding to the hinge module. The electronic device 220 includes a first protective cover 235 (e.g., a first protective frame or a first decorative member) coupled along edges of the first housing 230. The electronic device 220 includes a second protective cover 245 (e.g., a second protective frame or a second decorative member) coupled along edges of the second housing 240. The flexible display 260 may be positioned such that edges of the first flat portion 250a are interposed between the first housing 230 and the first protective cover 235. The flexible display 260 may be positioned such that the edges of the second flat portion 250b are interposed between the second housing 240 and the second protective cover 245. The flexible display 260 may be positioned such that by a protective cap disposed a region corresponding to the hinge module, the edge of the flexible display 260 corresponding to the protective cap can be protected. Accordingly, the edges of the flexible display 260 can be substantially protected from the outside.

The electronic device 220 may include a hinge housing (e.g., a hinge cover) configured to support the hinge module. The hinge housing may be disposed such that, when the electronic device 220 is in the folded state, the hinge housing is exposed to the outside and when the electronic device 220 is in the unfolded state, the hinge housing is introduced into a first space and a second space so as to be invisible from the outside.

The electronic device 220 includes a sub-display 251 disposed separately from the flexible display 260. The sub-display 251 is disposed on the second surface 232 of the first housing 230 to be at least partially exposed so as to display status information of the electronic device 220 in place of the display function of the flexible display 260 when the electronic device 220 is in the folded state. The sub-display 251 may be disposed to be visible from the outside through at least one region in the first rear cover 234. The sub-display 251 may be disposed on the fourth surface 244 of the second housing 240. In this case, the sub-display 251 may be disposed to be visible from the outside through at least one region in the second rear cover 244.

The electronic device 220 includes an input device 223 (e.g., a microphone), sound output devices 221 and 222, a sensor module 224, camera devices 225 and 228, a key input device 226, and a connector port 227. The input device 223 (e.g., a microphone), the audio output devices 221 and 222, the sensor module 224, the camera devices 225 and 228, the key input device 226, or the connector port 227 are indicated as holes or shapes formed in the first housing 230 or the second housing 240, but may be defined as including substantial electronic components (an input device, a sound output device, a sensor module, or a camera device) operating through the holes or shapes.

The input device 223 may include at least one microphone 223 disposed in the second housing 240. The input device 223 may include a plurality of microphones 223 arranged to sense the direction of sound. The plurality of microphones 223 may be disposed at appropriate positions in the first housing 230 and/or the second housing 240.

The sound output devices 221 and 222 may include speakers 221 and 222. The speakers 221 and 222 may include a call receiver 221 disposed in the first housing 230 and a speaker 222 disposed in the second housing 240. The input device 223, the sound output devices 221 and 222, and the connector port 227 are provided in the first housing 230 and/or the second housing 240 of the electronic device 220, and may be exposed to the external environment through one or more holes formed in the first housing 230 and/or the second housing 240. At least one connector port 227 may be used to transmit/receive power and/or data with respect to an external electronic device. The at least one connector port (e.g., an ear jack hole) may accommodate a connector (e.g., an ear jack) for transmitting/receiving an audio signal with respect to an external electronic device. The holes formed in the first housing 230 and/or the second housing 240 may be commonly used for the input device 223 and the sound output devices 221 and 222. The sound output devices 221 and 222 may include a speaker (e.g., a piezo speaker) that operates without holes formed in the first housing 230 and/or the second housing 240.

The sensor module 224 may generate an electrical signal or a data value corresponding to an internal operating state of the electronic device 220 or an external environmental state. The sensor module 224 may detect an external environment through the first surface 231 of the first housing 230. The electronic device 220 may further include at least one sensor module disposed to detect an external environment through the second surface 232 of the first housing 230. The sensor module 224 (e.g., an illuminance sensor) may be disposed under the flexible display 260 in order to detect an external environment through the flexible display 260. The sensor module 224 may include at least one of a gesture sensor, a gyro sensor, an atmospheric pressure sensor, a magnetic sensor, an acceleration sensor, a grip sensor, a color sensor, an IR sensor, a biometric sensor, a temperature sensor, a humidity sensor, an illuminance sensor, a proximity sensor, a biometric sensor, an ultrasonic sensor, or an illuminance sensor.

The camera devices 225 and 228 may include a first camera device 225 (e.g., a front camera device) and a second camera device 228 disposed on the second surface 232 of the first housing 230. The electronic device 220 further includes a flash 229 disposed near the second camera device 228. The camera devices 225 and 228 may include one or more lenses, an image sensor, and/or an ISP. For example, the flash 229 may include an LED or a xenon lamp.

The camera devices 225 and 228 may be arranged such that two or more lenses (a wide-angle lens, an ultra-wide-angle lens, or a telephoto lens) and image sensors are located on one surface (e.g., the first surface 231, the second surface 232, the third surface 241, or the fourth surface 242) of the electronic device 220. The camera devices 225 and 228 may include lenses for time-of-flight (TOF) lenses and image sensors.

The key input device 226 (e.g., a key button) may be disposed on the third side surface 233c of the first side frame 233 of the first housing 230. The key input device 226 includes at least one of the other side surfaces 233a and 233b of the first housing 230 and/or the side surfaces 243a, 243b, and 243c of the second housing 240. Alternatively, the electronic device 220 may not include some or all of the key input devices 226, and a key input device 226 not included in the electronic device 220 may be implemented in another form such as a soft key on the flexible display 260. The key input device 226 may be implemented using a pressure sensor included in the flexible display 260.

Some of the camera devices 225 and 228 (e.g., the first camera device 225) and/or the sensor module 224 may be disposed to be exposed through the flexible display 260. For example, the first camera device 225 and/or the sensor module 224 may be disposed the space inside the electronic device 220 to be in contact with the external environment through an opening (e.g., a through hole) at least partially formed in the flexible display 260. Alternatively, the first camera device 225 and/or the sensor module 224 may be disposed in the space inside the electronic device 220 to perform the functions thereof without being visually exposed through the flexible display 260. In this case, a region of the flexible display 260 that faces the sensor module 224 and/or the first camera device 225 may not need to be opened.

Alternatively, the electronic device 220 may include a pair of housings disposed on opposite sides of a folding axis, which is oriented in a direction different from that of the folding axis (axis A) illustrated in FIGS. 2C to 2E, and rotatably coupled to each other so as to be folded to face each other.

The electronic device 220 may also include multiple pairs of housings that are rotatably coupled so as to be folded to face each other about a plurality of hinge modules.

Figure 3:
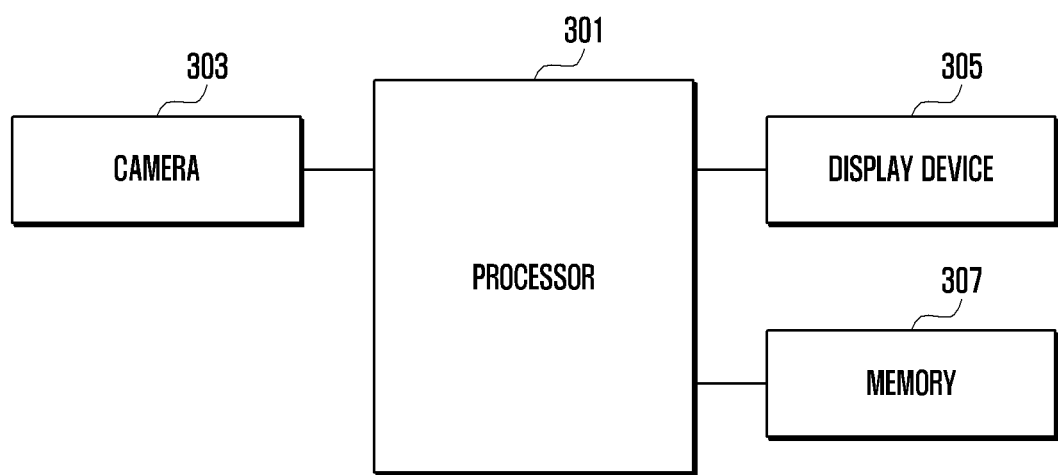
FIG. 3 illustrates an electronic device for providing functions related to a camera according to an embodiment.

FIG. 3 illustrates an electronic device for providing functions related to a camera according to an embodiment. For example, the electronic device of FIG. 3 may be at least partially similar to the electronic device 100 of FIG. 1, the electronic device 200 of FIGS. 2A and 2B, or the electronic device 220 of FIGS. 2C to 2E, or may include other embodiments of the electronic devices.

Referring to FIG. 3, the electronic device includes a processor 301 (e.g., processor 120 of FIG. 1), a camera 303 (e.g., camera module 180 of FIG. 1), a display device 305 (e.g., display device 160 of FIG. 1), and a memory 307 (e.g., memory 130 of FIG. 1). The processor 301 may include an AP, a graphics processing device, and/or an ISP.

When receiving a user input for acquiring an image content, the processor 301 may acquire a plurality of first images having a first attribute and one or more second images having a second attribute different from the first attribute based on image information (e.g., raw data) acquired through the camera 303 for a predetermined time. The first images may be a plurality of preview images acquired in a first cycle for a predetermined time, and may have a first attribute having a relatively lower resolution compared to the second images. The second images may be one or more captured images acquired for a predetermined time, and may have a second attribute having a relatively higher resolution compared to the first images.

When the camera 303 supports an auto-focus (AF) function, the second images may be acquired based on focus information on an external object (e.g., a subject) for a predetermined time. For example, the second images may be acquired when the camera 303 is focused. When the camera 303 does not support the AF function, the second images may be acquired for a predetermined time in a second cycle different from the first cycle. For example, the second cycle may be relatively longer than the first cycle. Because the second images and the first images are generated based on image information acquired through the camera 303 for a predetermined time, the second images may include the same time information (e.g., time stamp) as at least some of the first images.

The second images may be acquired based on a first capture method (e.g., a multi-image capture method) or a second capture method (e.g., a single image capture method). The multi-image capture method may include generating one or more captured images by removing noise included in an image using a plurality of images continuously acquired through the camera 303 as inputs. The single image capture method may include generating a captured image based on one image acquired at a specific point in time through the camera 303.

The predetermined time may include a predetermined time interval for acquiring the first images and/or the second images for generating various types of image content. The predetermined time may be set to be greater than a minimum image acquisition time set to acquire the first images and/or the second images for generating various types of image content, and may be set to be less than or equal to a maximum image acquisition time. For example, when acquiring the first images and/or the second images based on a user input for acquiring image content, the processor 301 may control the display device 305 to display the first images.

When the minimum image acquisition time has elapsed from the time at which acquisition of the first images and/or the second images starts, the processor 301 may control the display device 305 to activate a photographing end button. For example, when a user input related to a photographing end button is received or when the maximum image acquisition time expires, the processor 301 may control the camera to end the acquisition of the first images and/or the second images.

The processor 301 may detect scene information of the first images and/or the second images. The processor 301 may detect scene information for each of the plurality of first images. The processor 301 may control the memory 307 to store the first images and scene information detected from the first images. The processor 301 may acquire scene information of the second images based on the scene information detected from the first images. The processor 301 may identify a first image having the same time information as the second image among the plurality of first images. The processor 301 may determine the scene information of the first image having the same time information, as the scene information of the second image having the same time information. The processor 301 may control the memory 307 to store the second images and the detected scene information of the second images (e.g., the scene information of the first image having the same time information).

The processor 301 may generate various types of image content based on the first images and/or the second images acquired for a predetermined time. The various types of image content may include at least one still image or at least one moving image.

The processor 301 may generate at least one moving image based on the plurality of first images. The processor 301 may generate a first moving image in which the plurality of first images are continuously reproduced, and may generate a second moving image in which the plurality of first images are reproduced at a relatively faster speed than the first moving image. The processor 301 may detect a section in which a motion of an external object occurs among the plurality of first images. The processor 301 may generate a third moving image in which the plurality of first images included in the section in which a motion occurs are continuously reproduced. The section in which a motion occurs may be detected based on motion information of at least one external object included in the first images or changes in feature points included in the first images. The changes in feature points may include a change in a photographing time point, a change in brightness, or a change in a background (e.g., a surrounding environment).

The processor 301 may generate at least one still image based on the one or more second images. The processor 301 may select at least one candidate image for generating a still image from among the one more second images. The candidate image may be selected based on image quality of the one or more second images, brightness information of the second images, color information of the second images, composition of an external object included in the second images, and/or face recognition information detected from the second images. The image quality may be set based on focus information (e.g., blur) of an external object included in the second images, noise information included in the second images, or contrast information of the second images. The processor 301 may remove a similar image from among one or more candidate images.

The processor 301 may determine whether to apply an image effect to one or more candidate image remaining after a similar image has been removed. When it is determined that the image effect is to be applied, the processor 301 may select an image effect to be applied to each candidate image. The processor 301 may generate at least one still image by applying an image effect to the candidate image. Based on scene information (e.g., scene category or scene attribute) of at least one candidate image, the processor 301 may determine whether to apply an image effect to the candidate image or an image effect to be applied to the candidate image. Applying an image effect may include a series of operations of changing at least one of color, transparency, style, contrast, or saturation of the second images. When it is determined that an image effect is not applied, the processor 301 may generate at least one still image corresponding to at least one candidate image from which a similar image has been removed.

The processor 301 may control the display device 305 to display simultaneously (or together or at once) various types of image content generated based on the first images and/or the second images. The processor 301 may generate thumbnails of various types of image content generated based on the first images and/or the second images. The processor 301 may generate thumbnails corresponding to respective image content. The processor 301 may generate a thumbnail in which various types of image content are displayed on one screen of the display device 305.

The camera 303 may photograph a still image and/or a moving image. The camera 303 may be disposed on the first surface of the electronic device (e.g., the first surface 210A in FIG. 2A or the first surface 231 in FIG. 2C) or the second surface (e.g., the second surface 210B in FIG. 2B or the second surface 232 in FIG. 2E) facing away from the first surface. The camera 303 may include one or more lenses or image sensors.

The display device 305 may display information processed by the electronic device. The display device 305 may display various types of image content generated by the processor 301 at the same time point (or at once) in different regions.

The memory 307 may store various data to be used by at least one component of electronic device (e.g., the processor 301 or the camera 303). The data may include at least one of a plurality of first images having a first attribute, one or more second images having a second attribute, and/or scene information. The data may include input data or output data for software and instructions related thereto.

The electronic device may include a plurality of cameras. The electronic device may also include at least one additional camera, other than the camera 303. The camera 303 and the at least one additional camera may be arranged in the electronic device to acquire images of an external object (e.g., a subject) in the same direction or to acquire images of an external object (e.g., subject) in different directions. For example, the camera 303 may be disposed on a first surface of the electronic device and the additional camera may be disposed on a second surface (e.g., the second surface 210B in FIG. 2B or the second surface 232 in FIG. 2E). Alternatively, the additional camera may be disposed on the first surface of the electronic device and the camera 303 may be disposed on the second surface. The additional camera may include one or more lenses or image sensors. The camera 303 and the additional camera may be driven independently of each other.

When receiving a user input for acquiring an image content, the processor 301 may acquire one or more third images having a third attribute based on image information (e.g., raw data) acquired through the additional camera for a predetermined time. The third images may be one or more captured images acquired for a predetermined time, and may have a third attribute having a relatively higher resolution compared to the first images and/or a relatively wider field of view compared to the second images.

When the additional camera supports an AF function, the third images may be acquired based on focus information on an external object for a predetermined time. The third images may be acquired when the additional camera is focused. When the additional camera does not support the AF function, the third images may be acquired for a predetermined time in a third cycle different from the first cycle and/or the second cycle. The third cycle may be relatively longer than the first cycle, and may be set to be the same as or different from the second cycle.

The third images may be acquired based on a capture method that is the same as or different from the second images. The second images may be acquired based on a first capture method (e.g., a multi-image capture method) or a second capture method (e.g., a single image capture method). The second images and/or the third images may be generated in a hardware abstract layer (HAL).

The processor 301 may generate various types of image content based on the second images and/or the third images acquired for a predetermined time. The processor 301 may generate at least one still image based on the one or more second images and the one or more third images. The processor 301 may select one or more candidate images for generating a still image from among the one more second images.

The processor 301 may select the one or more third images corresponding to at least one candidate image. The processor 301 may set a display region for cropping the candidate images at a predetermined magnification from the third images corresponding to the candidate images. The processor 301 may generate one or more still images by extracting at least a portion of each candidate image based on the display region information.

The processor 301 may detect a remaining region from the one or more third images corresponding to the one or more candidate images, except for an external object identical to an external object included in the candidate images. The processor 301 may generate one or more still images using the external object included in the one or more candidate images and the remaining region detected from the one or more third images. The processor 301 may generate one or more still images based on the one or more third images corresponding to the one or more candidate images.

According to an embodiment, an electronic device (e.g., the electronic device 101 in FIG. 1, the electronic device 200 in FIGS. 2A and 2B, the electronic device 220 in FIGS. 2C to 2E, or the electronic device in FIG. 3) may include a display device (e.g., the display device 160 in FIG. 1 or the display device 305 in FIG. 3); a first camera (e.g., the camera module 180 in FIG. 1 or the camera 303 in FIG. 3); at least one processor (e.g., the processor 120 in FIG. 1 or the processor 301 in FIG. 3) operatively connected to the first camera and the display device; and a memory (e.g., the memory 130 in FIG. 1 or the memory 307 in FIG. 3) operatively connected to the at least one processor, wherein the memory may be configured to cause the at least one processor to acquire a plurality of first images having a first attribute and one or more second images having a second attribute through the first camera for a predetermined time when an input associated with image acquisition is received; generate one or more image content based on the plurality of first images or the one or more second images; and output the one or more image content through the display device.

The electronic device may further include a housing (e.g., the housing 210 in FIG. 2A or the housings 230 and 240 in FIG. 2C) including a first surface and a second surface facing away from the first surface, wherein the display device is exposed through the first surface of the housing, and the first camera is configured to acquire an image related to an external environment through the first surface or the second surface of the housing.

The plurality of first images having the first attribute include a plurality of images acquired in a first cycle and having a first resolution, and the one or more second images having the second attribute include one or more images having a second resolution different from the first resolution.

The electronic device may further include a second camera, wherein the memory may be configured to cause the at least one processor to acquire one or more third images having a third attribute through the second camera for the predetermined time; generate one or more image content based on at least one of the plurality of first images, the one or more second images, or the one or more third images; and output the one or more image content through the display device.

The second camera may be configured to acquire an image related to an external environment in a direction that is the same as or different from the first camera in the electronic device.

The one or more image content may include at least one of one or more moving images generated based on the plurality of first images or one or more still images generated based on the one or more second images.

The memory may be configured to cause the at least one processor to select one or more first images based on a motion image of an external object included in the plurality of first images; and generate the one or more image content including at least one moving image based on the one or more first images.

The memory may be configured to cause the at least one processor to detect one or more first candidate images from among the one or more second images based on at least one of image quality of the one or more second images, brightness information of the one or more second images, a composition of an external object included in the one or more second images, or face recognition information detected from the one or more second images; detect one or more second candidate images by removing an overlapping image from among the one or more first candidate images; select an image effect to be applied to the one or more second candidate images based on scene information of the one or more candidate images; and generate the one or more image content including one or more still images by applying the selected image effect to the one or more second candidate images.

The memory may be configured to cause the at least one processor to detect scene information from the plurality of first images; detect one or more first images having time information which is identical to time information of the one or more second candidate images from among the plurality of first images; and determine the scene information detected from the plurality of first images as scene information of the one or more second candidate images.

The memory may be configured to cause the at least one processor to control the display device to display the one or more image content in different regions of one screen.

Figure 4:
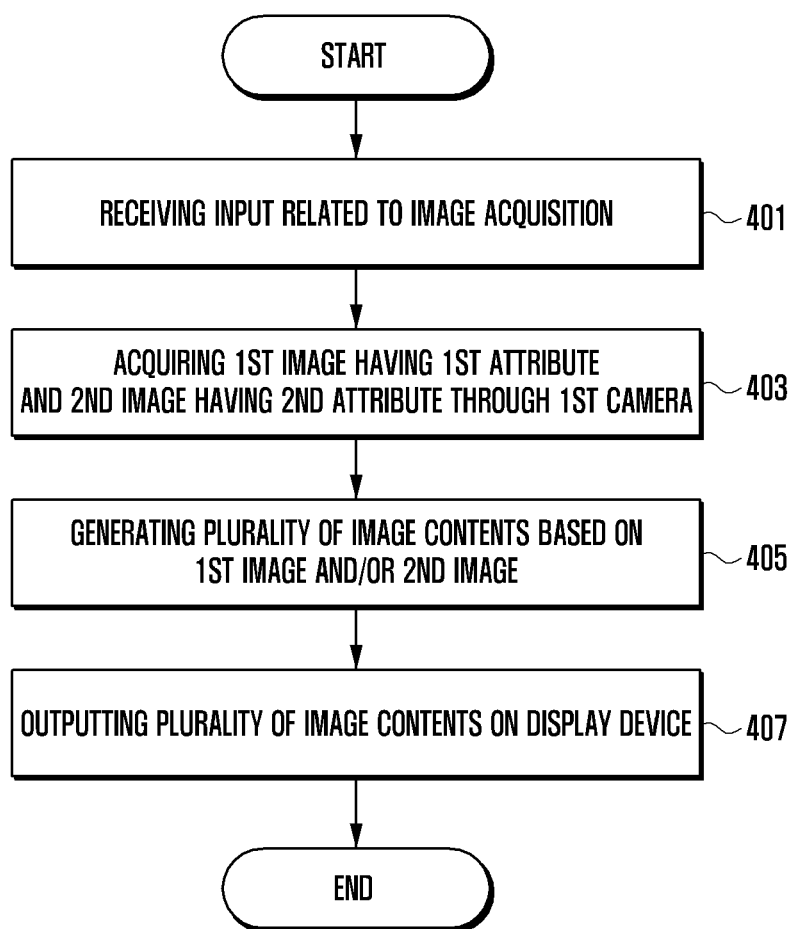
FIG. 4 is a flowchart illustrating functions related to a camera in an electronic device according to an embodiment.

FIG. 4 is a flowchart illustrating a method for providing functions related to a camera in an electronic device according to an embodiment. In the following embodiments, respective operations may be performed sequentially, but are not necessarily performed sequentially. For example, the order of operations may be changed, and at least two operations may be performed in parallel. For example, the electronic device may be the electronic device 101 of FIG. 1, the electronic device 200 of FIGS. 2A and 2B, the electronic device 220 of FIGS. 2C to 2E, or the electronic device of FIG. 3. As an example, at least some components in FIG. 4 may be described with reference to FIGS. 5, 6A, and 6B.

Referring to FIG. 4, an electronic device (e.g., a processor thereof) receives a user input related to image acquisition in operation 401.

Figure 6A:
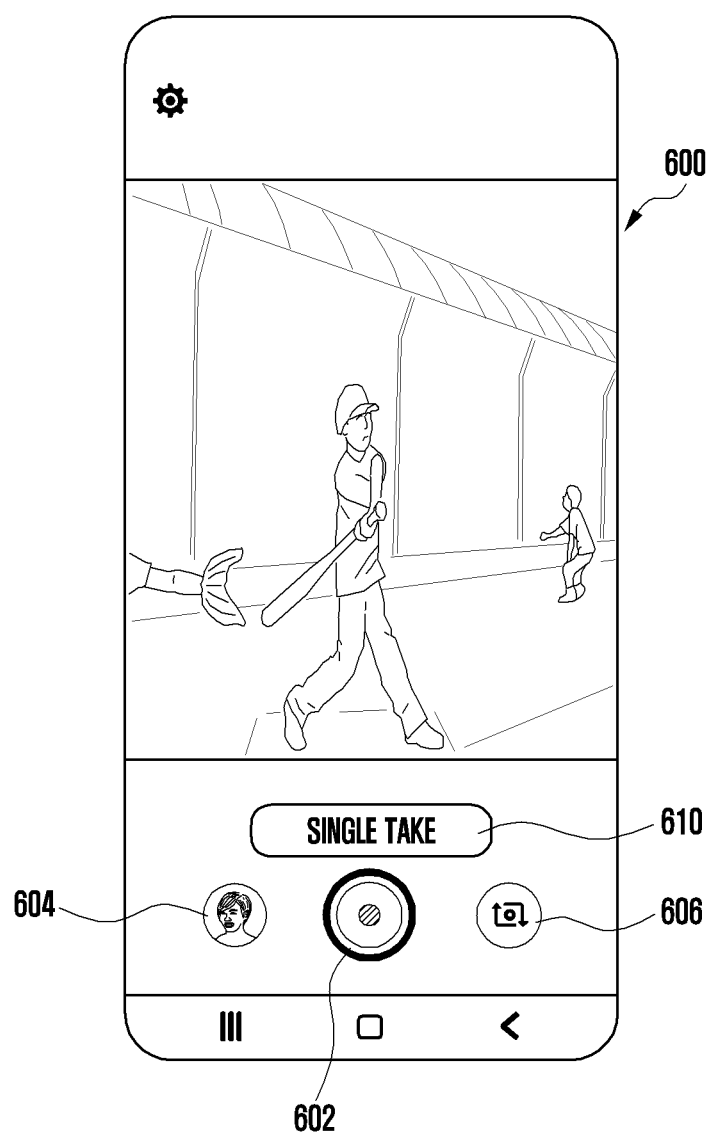
FIG. 6A illustrates a screen configuration related to a camera according to an embodiment.

FIG. 6A illustrates a screen configuration related to a camera according to an embodiment.

Referring to FIG. 6A, when a camera application is executed, the processor may control the display device to display a camera application execution screen including a preview image 600. The processor may identify whether or not a user input related to the photographing button 602 is received in the camera application execution screen displayed on the display device. The camera application execution screen includes at least one of a preview image 600, a photographing button 602, a photographed image identification button 604, a camera switch button 606, or photographing mode information 610 (e.g., "single take"). The photographed image identification button 604 may include a menu for identifying an image content acquired based on a user input related to the photographing button 602. The camera switch button 606 may include a menu for switching a camera for acquiring an image to another camera.

Referring again to FIG. 4, in operation 403, the electronic device acquires a plurality of first images having a first attribute and one or more second images having a second attribute based on image information (e.g., a raw image) acquired through the first camera for a predetermined time.

Figure 5:
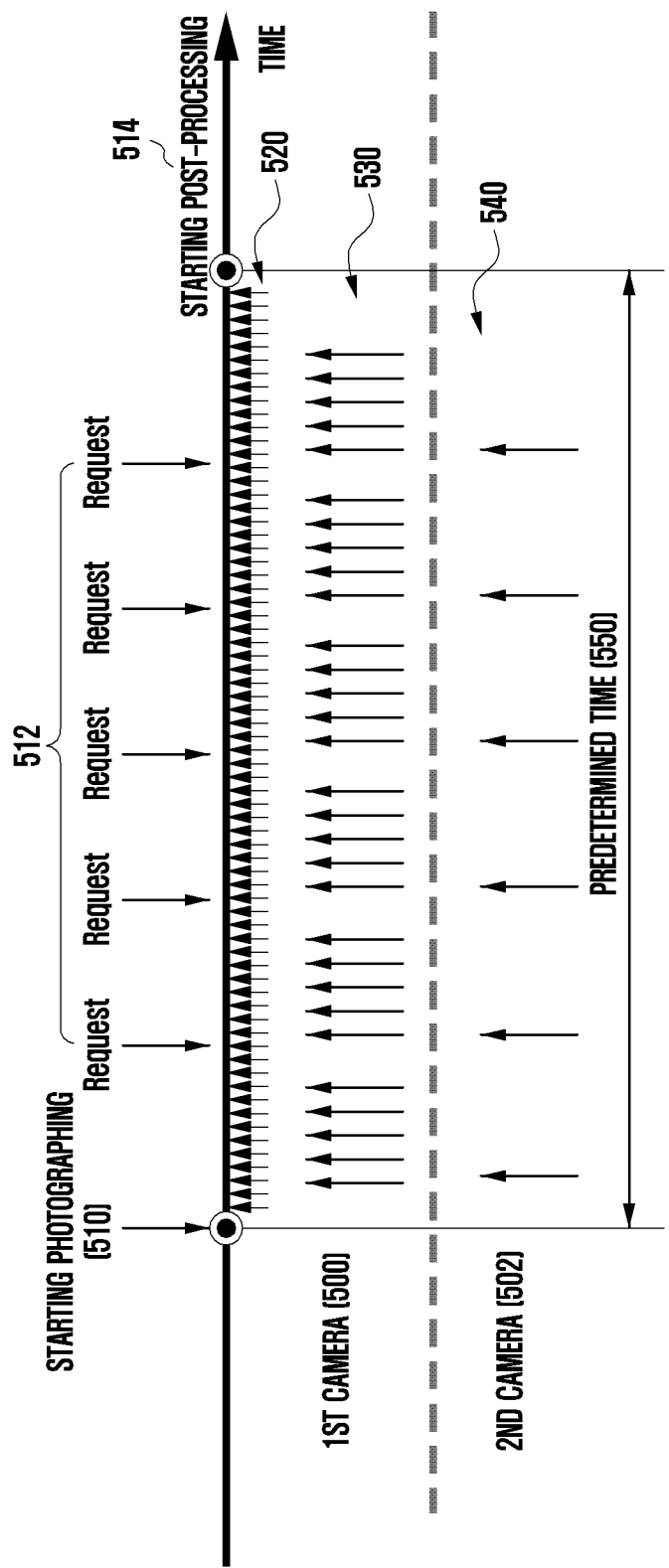
FIG. 5 illustrates time points at which images are acquired using a camera according to an embodiment.

FIG. 5 illustrates time points at which images are acquired using a camera according to an embodiment.

Referring to FIG. 5, the first images may be acquired in a first cycle 520 through a first camera 500 for a predetermined time 550 from the time point 510 at which photographing was started based on a user input related to image acquisition, and may have a first attribute having a relatively lower resolution than the second images. The second images are acquired through the first camera 500 for the predetermined time 550 from the time point 510 at which the photographing was started, and may have a second attribute having a relatively higher resolution than the first images. The time points 530 at which the second images are acquired may be determined based on a user input related to the time point 510 at which photographing was started and/or at least one request signal 512 generated for the predetermined time 550. When using the first capture method (e.g., a multi-image capture method), the processor may acquire one second image from which noise has been removed using a plurality of images (e.g., about 5 images) that are successively acquired at each time point at which the request signal 512 is generated. The second image may be acquired based on a second capture method (e.g., a single image capture method) at each time point at which the request signal 512 is generated. When the first camera 500 supports an AF function, the request signal may be generated based on focus information on an external object (e.g., a subject) for the predetermined time 550. When the first camera 500 does not support the AF function, the request signal may be generated in a second cycle different from the first cycle for the predetermined time 550. The first images and the second images may be generated using the same image information (e.g., a raw image) acquired through the same first camera 500. The first images may include an image processed to have a first attribute using a raw image acquired through the first camera 500. The second images may include an image processed to have a second attribute using a raw image acquired through the first camera 500.

The electronic device may further include a second camera. The electronic device may acquire one or more third images having a third attribute based on image information (e.g., a raw image) acquired through the second camera for a predetermined time.

Referring again to FIG. 5, the third images are acquired through the second camera 502 for the predetermined time 550, and may have a third attribute having a relatively higher resolution compared to the first images and/or a relatively wider field of view compared to the second images. The time points 540 at which the third images are acquired may be determined based on a user input related to the time point 510 at which photographing was started and/or at least one request signal 512 generated for the predetermined time 550. When the second camera 502 supports the AF function, the third images may be generated based on the request signal 512 generated based on focus information on an external object (e.g., a subject) for the predetermined time 550. When the second camera 502 does not support the AF function or is in a low-illuminance situation, the third images may be acquired in a third cycle based on at least one request signal 512 generated for the predetermined time 550. The third cycle may be relatively longer than the first cycle, and may be set to be the same as or different from the second cycle. When using the second capture method (e.g., a single image capture method), the processor may acquire one third image at each time point at which the request signal 512 is generated. The third image may also be acquired based on a first capture method (e.g., a multi-image capture method) at each time point at which the request signal 512 is generated. Because the third images are acquired through the second camera 502, the third images may include a captured image at a time point that is the same as or different from the time point at which the second images are acquired through the first camera 500.

Referring to FIG. 4, in operation 405, the electronic device generates one or more image content of various types based on the plurality of first images and/or the one or more second images. The image content may include at least one moving image generated based on the plurality of first images and/or at least one still image generated based on the one or more second images.

In operation 407, the electronic device outputs, through the display device, the one or more image content of various types generated based on the first images and/or the second images.

Referring again to FIG. 6A, when receiving a user input related to the photographed image identification button 604 in the camera application execution screen, the processor may control the display device to simultaneously display a first still image 622, a second still image 624, a third still image 626, a first moving image 628, or a second moving image 630.

Figure 6B:
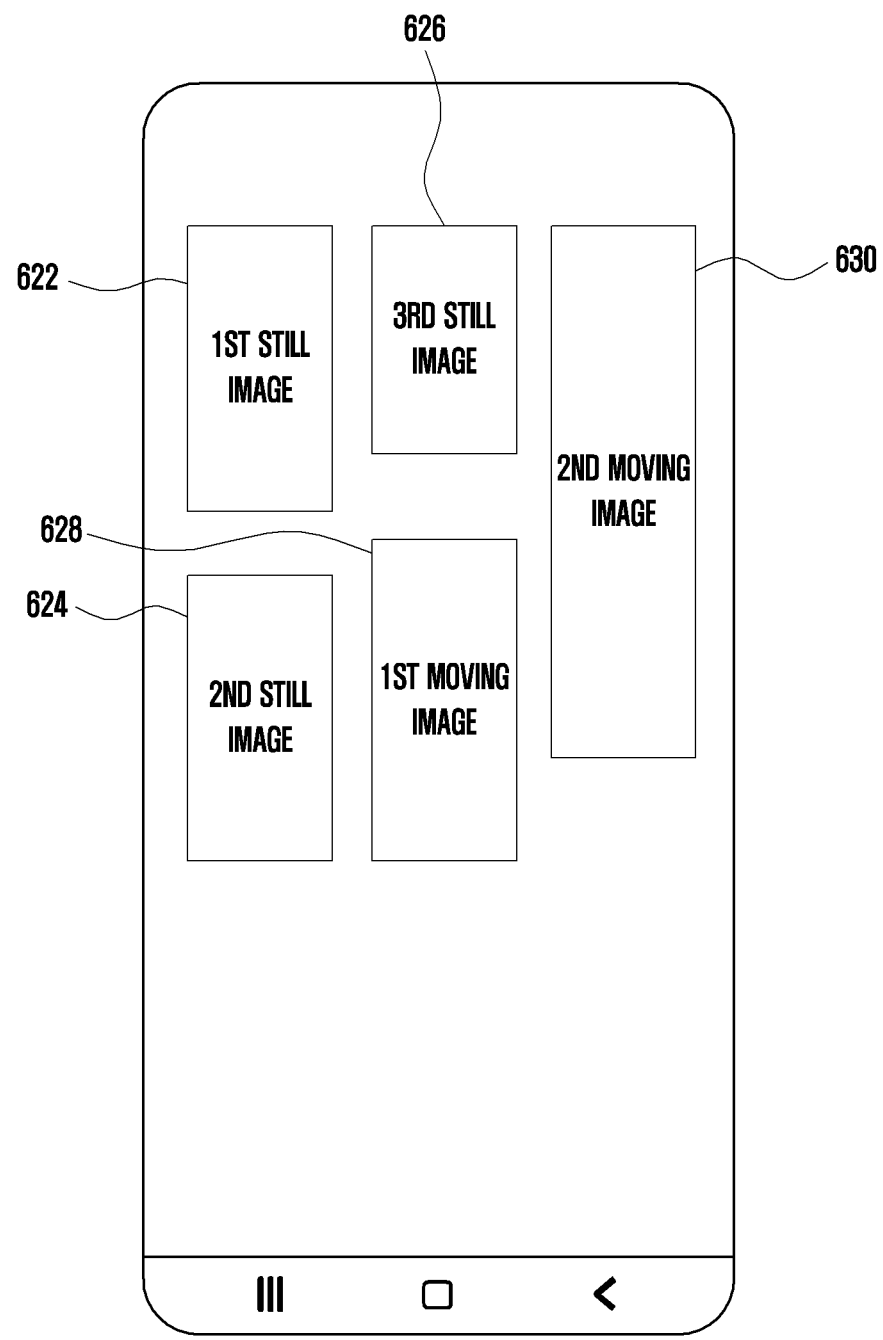
FIG. 6B illustrates an image content output screen according to an embodiment.

FIG. 6B illustrates an image content output screen according to an embodiment.

Referring to FIG. 6B, when receiving a user input related to the photographed image identification button 604 in the camera application execution screen of FIG. 6A, the processor may control the display device to simultaneously display the first still image 622, the second still image 624, the third still image 626, the first moving image 628, or the second moving image 630. A composition in which various types of image content are displayed may be changed based on an image content display method or a user input.

Figure 7:
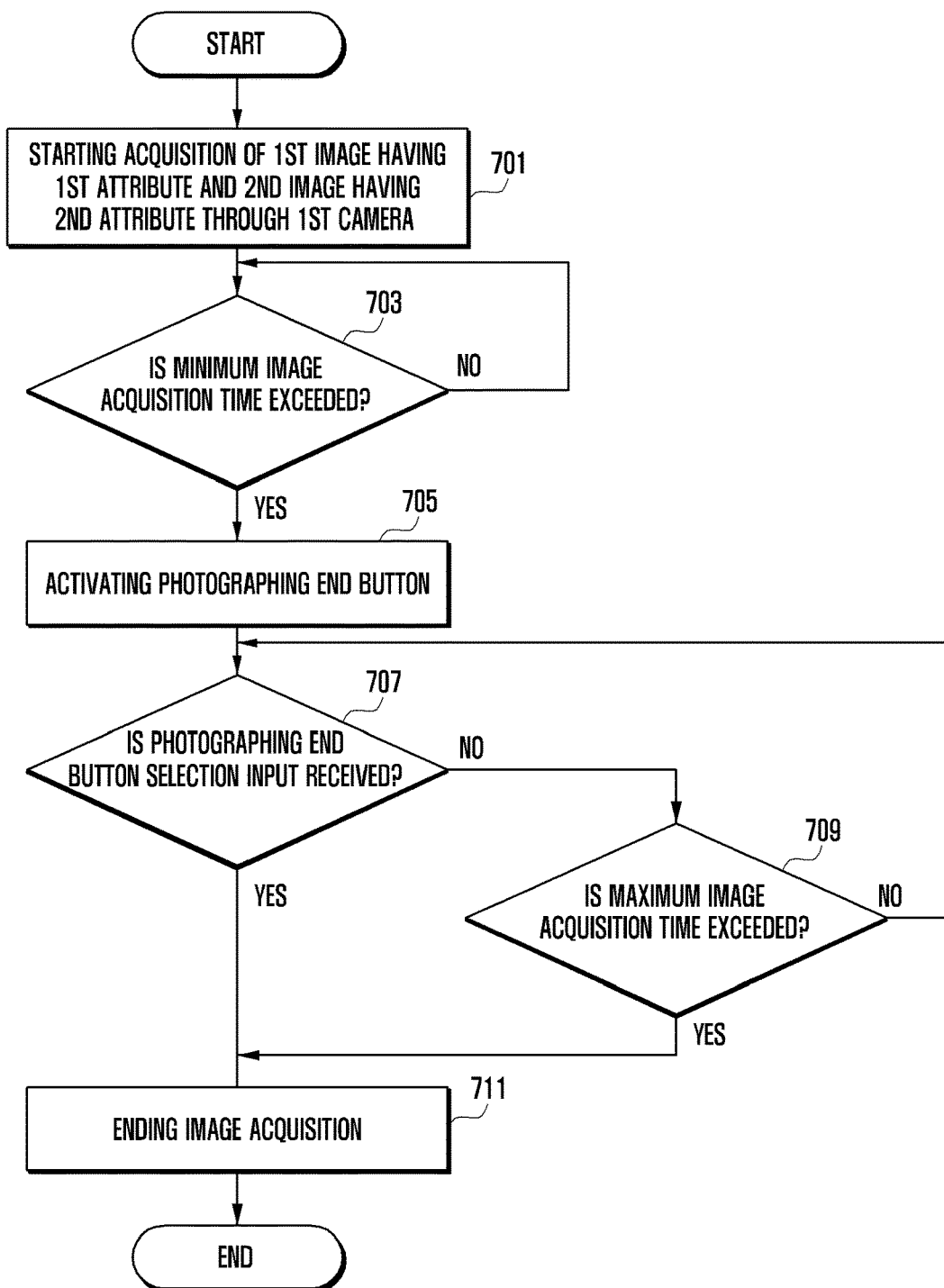
FIG. 7 is a flowchart illustrating a method for acquiring an image in an electronic device according to an embodiment.

FIG. 7 is a flowchart illustrating a method for acquiring an image in an electronic device according to an embodiment. According to an embodiment, the operations of FIG. 7 may correspond to an embodiment of operation 403 of FIG. 4. In the following embodiments, respective operations may be performed sequentially, but are not necessarily performed sequentially. For example, the order of operations may be changed, and at least two operations may be performed in parallel. For example, the electronic device may be the electronic device 101 of FIG. 1, the electronic device 200 of FIGS. 2A and 2B, the electronic device 220 of FIGS. 2C to 2E, or the electronic device of FIG. 3. As an example, at least some components in FIG. 7 may be described with reference to FIGS. 8A and 8B.

Referring to FIG. 7, in operation 701, an electronic device starts acquisition of a plurality of first images having a first attribute and one or more second images having a second attribute based on image information (e.g., a raw image) acquired through a first camera based on a user input related to image acquisition. For example, as illustrated in FIG. 6A, when receiving a user input related to the photographing button 602 in the camera application execution screen displayed on the display device, the processor may start acquisition of the first images having the first attribute and the second images having the second attribute through the camera.

Figure 8A:
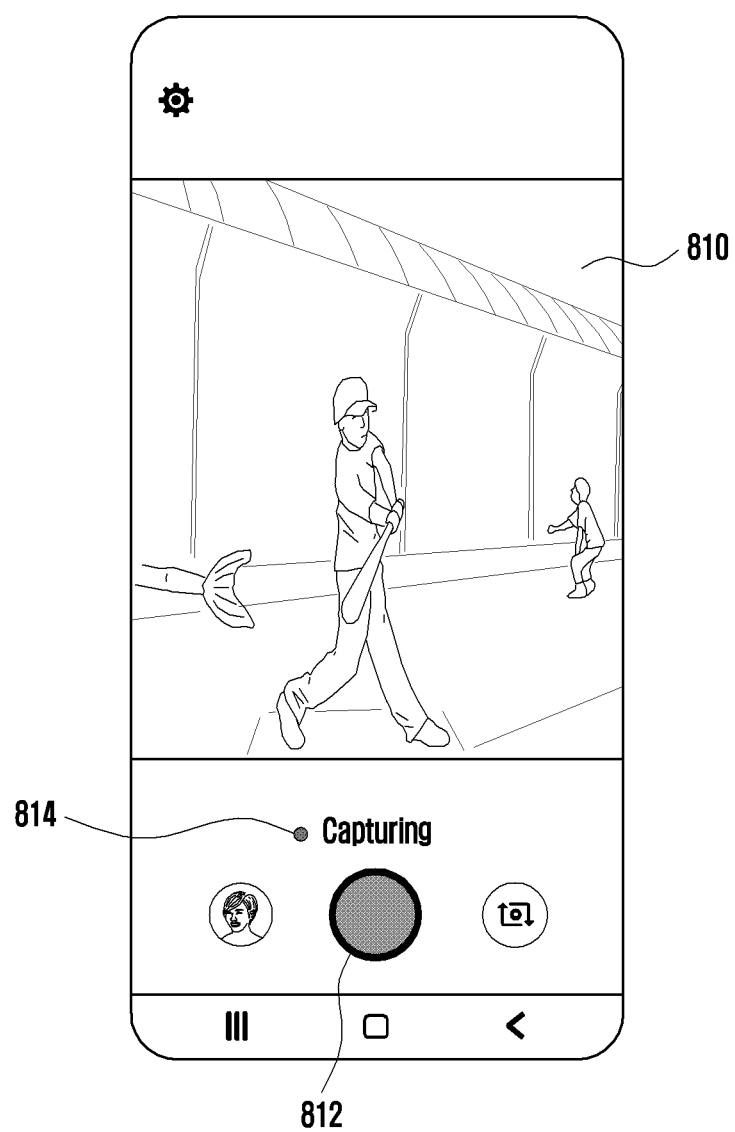
FIG. 8A illustrates a screen for acquiring an image according to an embodiment.

FIG. 8A illustrates a configuration of a screen for acquiring an image according to an embodiment.

Referring to FIG. 8A, when acquiring the first images and/or the second images, the display device may continuously display the first images (e.g., preview images) 810 in at least a portion of the camera application execution screen. The camera application execution screen may include information 814 (e.g., "capturing") indicating that the first images and/or the second images are being acquired in at least one region. When the acquisition of the first images and/or the second images starts, the photographing button 602 included in the camera application execution screen may be switched to the photographing end button 812. The capturing end button 812 may be deactivated from the start of acquisition of the first images and/or the second images until a minimum image acquisition time (e.g., about 3 seconds) elapses.

Referring again to FIG. 7, in operation 703, the electronic device determines whether or not the acquisition time of the first images and/or the second images exceeds the minimum image acquisition time. The processor may determine whether or not the time elapsed from the start of acquisition of image information (e.g., a raw image) through the camera exceeds a predetermined minimum image acquisition time based on a user input related to image acquisition. The predetermined minimum image acquisition time may include a predetermined minimum time for acquiring the first images and/or the second images in order to generate various types of image content.

When the acquisition time of the images and/or the second images does not exceed the minimum image acquisition time in operation 703, the electronic device continues to determine whether or not the acquisition time of the first images and/or the second images exceeds the minimum image acquisition time. The processor may determine whether or not the minimum image acquisition time elapses while acquiring the first images having the first attribute and/or the second images having the second attribute through the camera.

When the acquisition time of the first images and/or the second images exceeds the minimum image acquisition time in operation 703, the electronic device activates the photographing end button in operation 705.

Figure 8B:
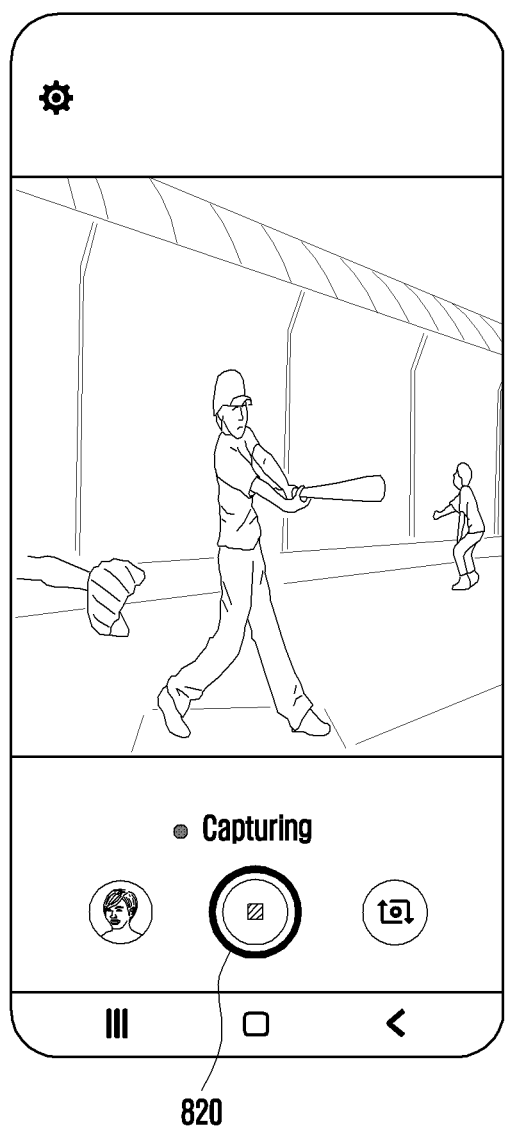
FIG. 8B illustrates a screen related to an end of photographing according to an embodiment.

FIG. 8B is a configuration of a screen related to the end of photographing according to various embodiments.

Referring to FIG. 8B, when the acquisition time of the first images and/or the second images exceeds the minimum image acquisition time, the processor may activate the photographing end button 820.

Referring again to FIG. 7, in operation 707, the electronic device determines whether or a user's selection input related to the photographing end button is received.

When the user's selection input related to the photographing end button is not received in operation 707, the electronic device determines whether or not the acquisition time of the first images and/or the second images exceeds a predetermined maximum image acquisition time (e.g., about 10 seconds) in operation 709. The processor may determine whether or not the time elapsed from the start of acquisition of image information (e.g., a raw image) through the camera exceeds a predetermined maximum image acquisition time based on a user input related to image acquisition.

When the acquisition time of the first images and/or the second images does not exceed the maximum image acquisition time in operation 709, the electronic device determines whether or not a user's selection input related to the photographing end button is received in operation 707. The processor may determine whether or not the user's selection input related to the photographing end button is received while acquiring the first images having the first attribute and/or the second images having the second attribute through the camera.

When the user's selection input related to the photographing end button is received in operation 707 or when the acquisition time of the first images and/or the second images exceeds the maximum image acquisition time in operation 709, the electronic device ends the acquisition of the first images and/or the second images in operation 711. For a predetermined time based on a maximum frame acquisition time or a time point at which a selection input related to the photographing end button is received, the processor may acquire the plurality of first images having the first attribute and the one or more second images having the second attribute through a first camera. The predetermined time may include a maximum frame acquisition time or a time from a time point at which photographing starts to a time point at which a selection input related to the photographing end button is received.

Figure 9:
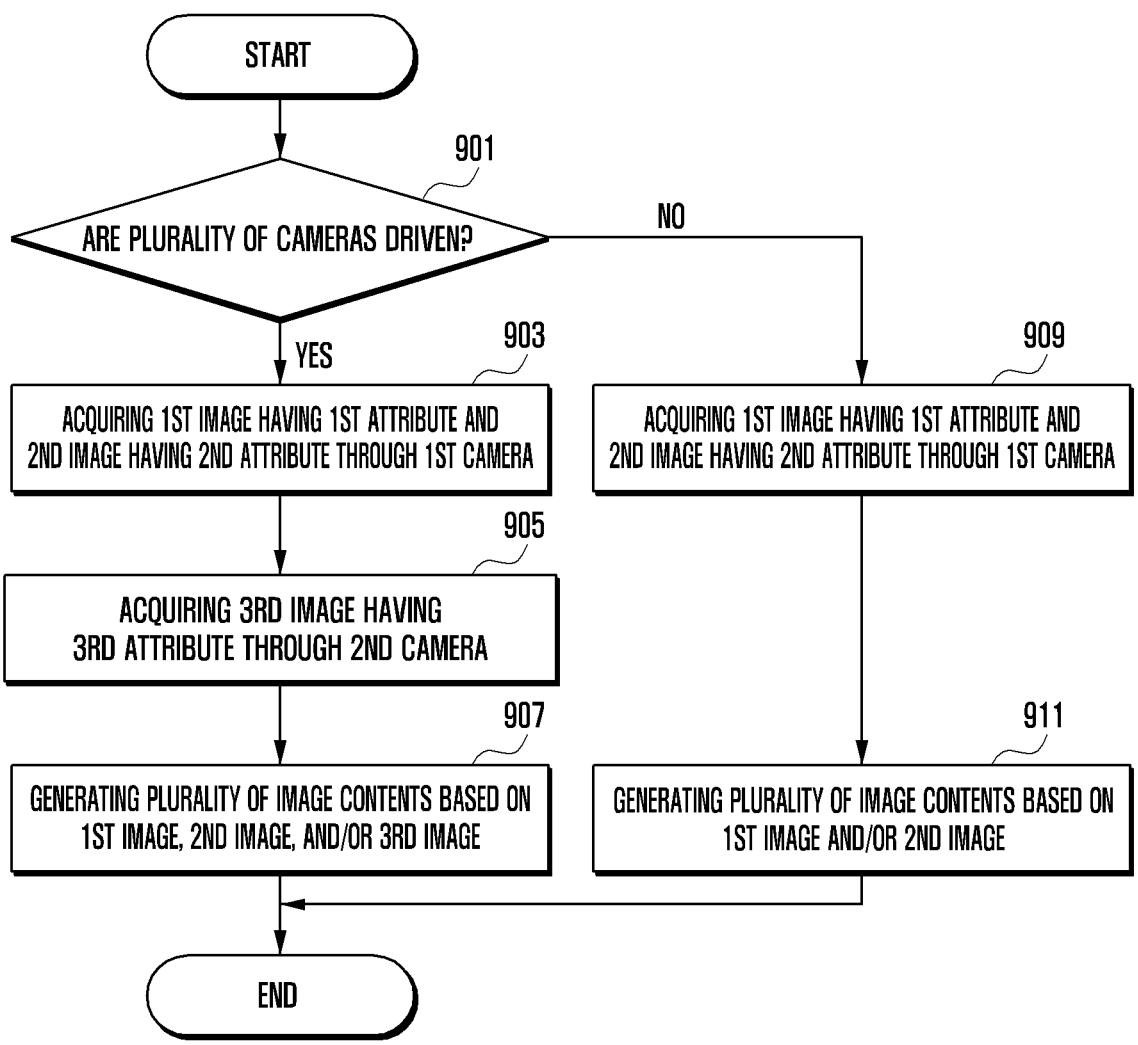
FIG. 9 is a flowchart illustrating a method for acquiring images using a plurality of cameras in an electronic device according to an embodiment.

FIG. 9 is a flowchart illustrating a method for acquiring images using a plurality of cameras in an electronic device according to an embodiment. According to an embodiment, the operations of FIG. 9 may correspond to an embodiment of operations 403 and 405 of FIG. 4. In the following embodiments, respective operations may be performed sequentially, but are not necessarily performed sequentially. For example, the order of operations may be changed, and at least two operations may be performed in parallel. For example, the electronic device may be the electronic device 101 of FIG. 1, the electronic device 200 of FIGS. 2A and 2B, the electronic device 220 of FIGS. 2C to 2E, or the electronic device of FIG. 3.

Referring to FIG. 9, when a user input related to image acquisition is received, an electronic device determines whether or not the plurality of cameras are driven in operation 901. The processor of the electronic device may determine whether or not a camera and at least one additional camera are driven to generate an image content. Whether the camera and at least one additional camera are driven may be determined based on at least one of an image content generation policy, camera arrangement information, or a user input.

When the plurality of cameras are driven in operation 901, the electronic device acquires a plurality of first images having a first attribute and one or more second images having a second attribute based on image information (e.g., a raw image) acquired through the first camera for a predetermined time in operation 903. For example, as illustrated in FIG. 5, the first images are a plurality of preview images acquired in the first cycle 520 through the first camera 500 for the predetermined time 550, and may have a first attribute having a relatively lower resolution than the second images. The second images are one or more captured images acquired through the first camera 500 for the predetermined time 550, and may have a second attribute having a relatively higher resolution than the first images. The time points 530 at which the second images are acquired may be determined based on one or more request signals 512 generated during the predetermined time 550.

In operation 905, the electronic device acquires one or more third images having a third attribute based on image information (e.g., a raw image) acquired through the second camera for a predetermined time. For example, as illustrated in FIG. 5, the third images are one or more captured images acquired through the second camera 502 for the predetermined time 550, and may have a third attribute having a relatively higher resolution compared to the first images and/or a relatively wider field of view compared to the second images. The time points 540 at which the third images are acquired may be determined based on at least one request signal 512 generated during the predetermined time 550. When using the second capture method (e.g., a single image capture method), the processor may acquire a third image based on the generation of the request signals 512. The third image may be acquired based on a first capture method (e.g., a multi-image capture method) based on the generation of the request signal 512. Because the third images are acquired through the second camera 502, the third images may include a captured image at a time point that is the same as or different from the time point at which the second images are acquired through the first camera 500.

Although operation 905 is indicated as being performed after operation 903, operations 903 and 905 may be performed in parallel.

In operation 907, the electronic device generates one or more image content of various types based on the first images, the second images, and/or the third images. The image content may include at least one moving image generated based on the first images and/or at least one still image generated based on the second images and/or the third images.

When the plurality of cameras are not driven in operation 901, the electronic device acquires a plurality of first images having a first attribute and one or more second images having a second attribute based on image information (e.g., a raw image) acquired through the first camera for a predetermined time in operation 909.

In operation 911, the electronic device generates one or more image content of various types based on the first images and/or the second images. The image content may include at least one moving image generated based on the first images, at least one still image to which an image effect generated based on the second images is applied, and/or at least one still image to which no image effect is applied.

When the plurality of cameras are driven, the electronic device may acquire second images and the third images through the first camera and the second camera at similar time points. As illustrated in FIG. 5, when acquiring a second image based on a first capture method (e.g., a multi-image capture method) and acquiring a third image based on a second capture method (e.g., a single image capture method), the processor may acquire a third image through the second camera at a time point similar to a time point at which an image for the second camera is acquired through the first camera, based on the request signal 512. When acquiring a second image and a third image based on a second capture method (e.g., a single image capture method), the processor may acquire a third image through the second camera at a time point similar to a time point at which the second image is acquired through the first camera, based on the request signal 512. Images at similar time points may include images including the same time information or images in which a difference in time information included therein is included within a predetermined range.

Figure 10:
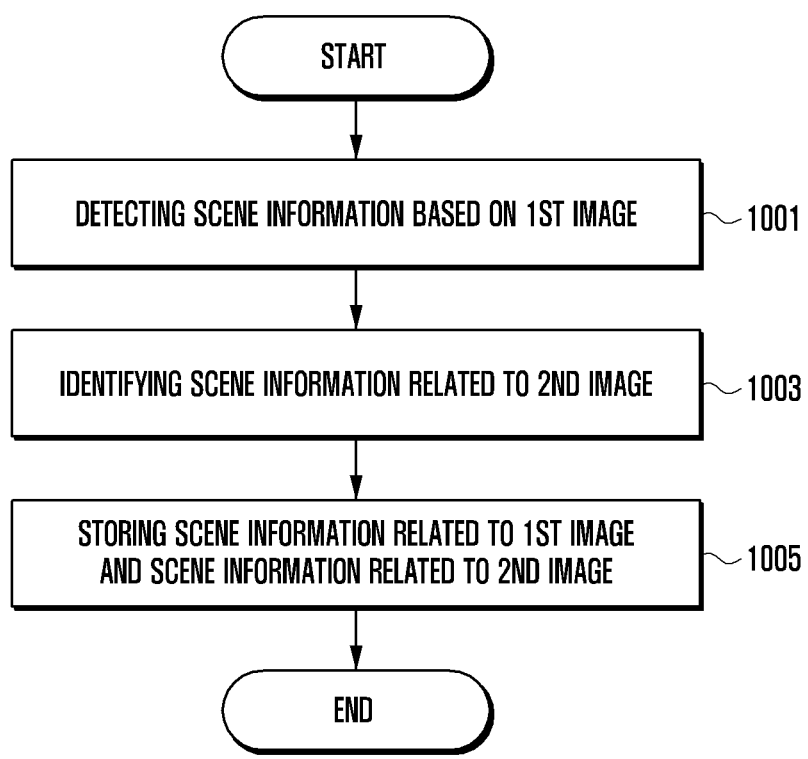
FIG. 10 is a flowchart illustrating a method for storing scene information in an electronic device according to an embodiment.

FIG. 10 is a flowchart illustrating a method for storing scene information in an electronic device according to an embodiment. In the following embodiments, respective operations may be performed sequentially, but are not necessarily performed sequentially. For example, the order of operations may be changed, and at least two operations may be performed in parallel. For example, the electronic device may be the electronic device 101 of FIG. 1, the electronic device 200 of FIGS. 2A and 2B, the electronic device 220 of FIGS. 2C to 2E, or the electronic device of FIG. 3.

Referring to FIG. 10, when a plurality of first images and one or more second images are acquired through a first camera for a predetermined time, the electronic device detects scene information based on the first images in operation 1001. A processor of the electronic device may detect scene information for each of the plurality of first images acquired through the camera.

In operation 1003, the electronic device identifies scene information related to the one or more second images. The processor may detect one or more first images having the same time information (e.g., time stamp) as the second images among the plurality of first images. The processor may determine that the scene information, detected in the one or more first images including the same time information as the one or more second images, is the scene information of the second images including the same time information as the first images.

In operation 1005, the electronic device stores the first images and the scene information related to the first images and/or the second images and the scene information related to the second images. The processor may control the memory to store the first images and the scene information related to the first images and the second images and the scene information related to the second images in different regions of the memory.

Figure 11:
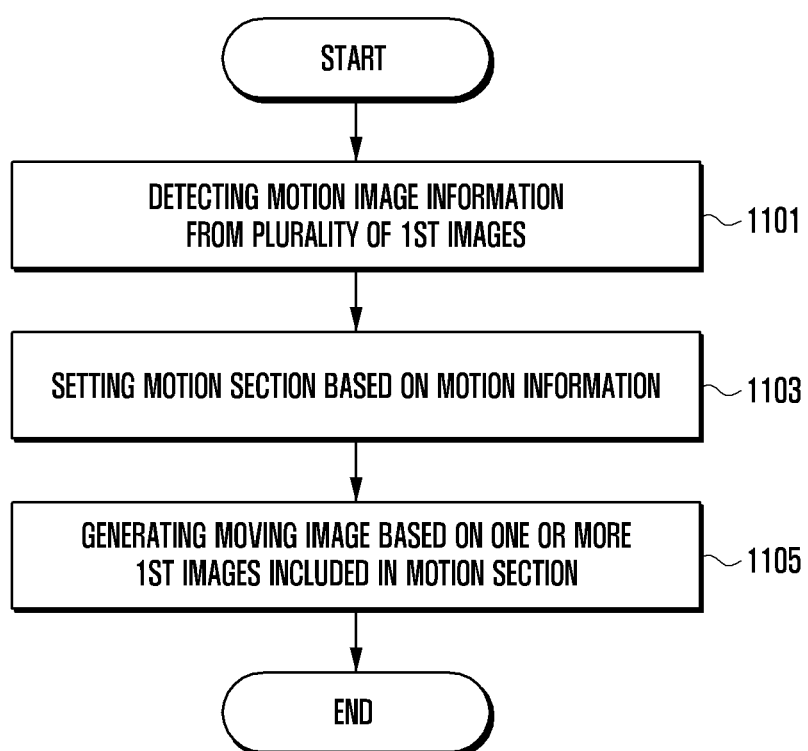
FIG. 11 is a flowchart illustrating a method for generating a moving image in an electronic device according to an embodiment.

FIG. 11 is a flowchart illustrating a method for generating a moving image in an electronic device according to an embodiment. According to an embodiment, the operations of FIG. 11 may correspond to an embodiment of operation 405 of FIG. 4. In the following embodiments, respective operations may be performed sequentially, but are not necessarily performed sequentially. For example, the order of operations may be changed, and at least two operations may be performed in parallel. For example, the electronic device may be the electronic device 101 in FIG. 1, the electronic device 200 in FIGS. 2A and 2B, the electronic device 220 in FIGS. 2C to 2E, or the electronic device in FIG. 3.

Referring to FIG. 11, the electronic device detects motion information in a plurality of first images acquired through a first camera for a predetermined time in operation 1101. A processor of the electronic device may detect motion information of one or more external objects in the plurality of first images acquired for the predetermined time and/or information on changes in feature points included in the plurality of first images. The changes in feature points may include a change in a photographing time point, a change in brightness, or a change in a background (e.g., a surrounding environment).

In operation 1103, the electronic device sets a motion section based on motion information of the plurality of first images acquired for the predetermined time. In the motion section, at least a portion of a sequence of the plurality of first images acquired for the predetermined time in which the motions of the external objects are continuously detected.

In operation 1105, the electronic device generates one or more moving images based on one or more first images included in the motion section. The moving images may include a fourth moving image in which the one or more first images included in the motion section are continuously and repeatedly reproduced and a fifth moving image in which the one or more first images included in the motion section are reproduced in the reverse order of the playback time points.

The electronic device may reproduce one or more moving images using a plurality of first images acquired for the predetermined. The moving images may include at least one of a first moving image in which a plurality of first images are continuously reproduced and a second moving image in which the plurality of first images are reproduced at a relatively higher speed than that in the first moving image.

Figure 12:
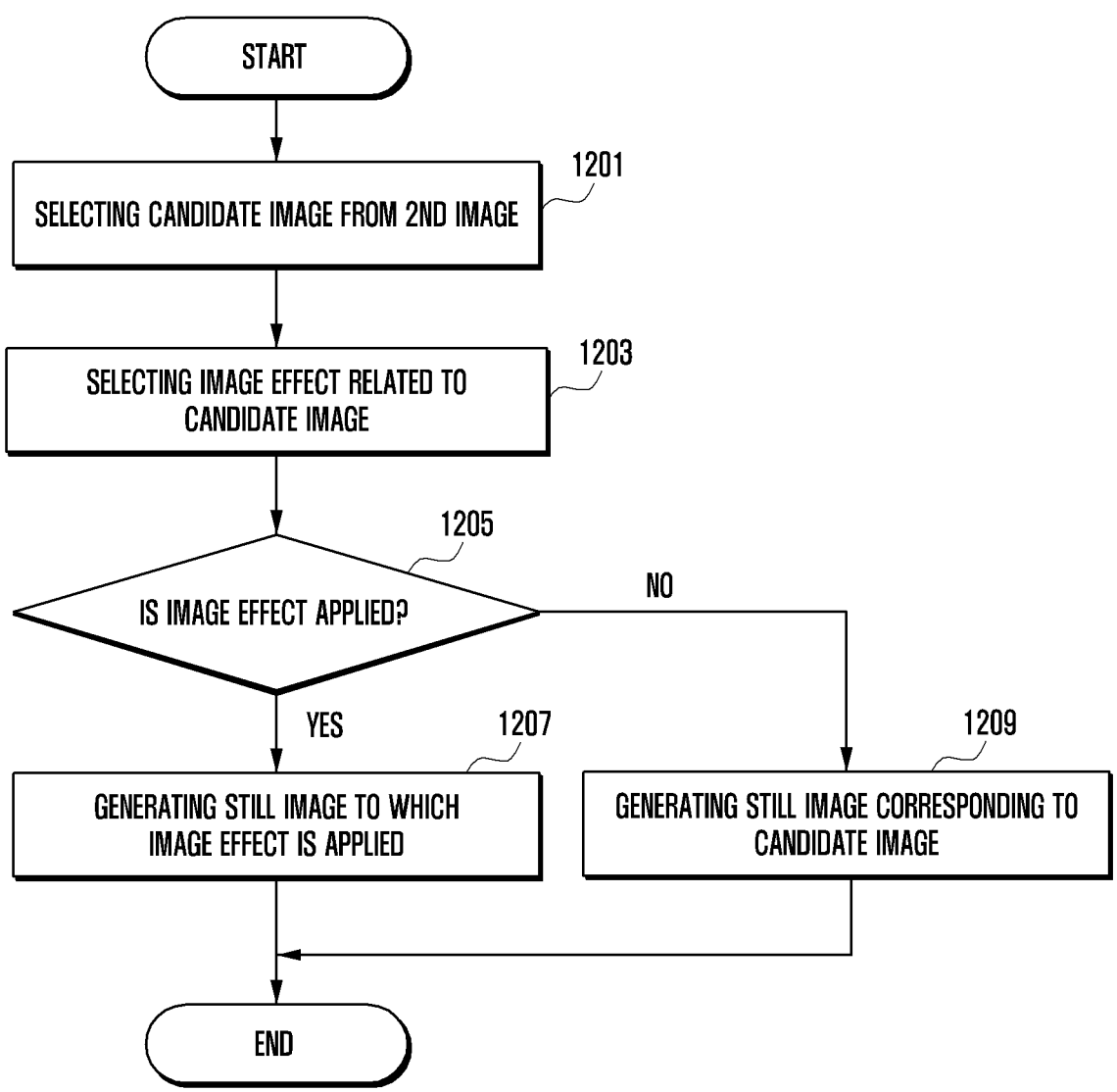
FIG. 12 is a flowchart illustrating a method for generating a still image in an electronic device according to an embodiment.

FIG. 12 is a flowchart illustrating a method for generating a still image in an electronic device according to an embodiment. According to an embodiment, the operations of FIG. 12 may correspond to an embodiment of operation 405 of FIG. 4. In the following embodiments, respective operations may be performed sequentially, but are not necessarily performed sequentially. For example, the order of operations may be changed, and at least two operations may be performed in parallel. For example, the electronic device may be the electronic device 101 in FIG. 1, the electronic device 200 in FIGS. 2A and 2B, the electronic device 220 of FIGS. 2C to 2E, or the electronic device in FIG. 3.

Referring to FIG. 12, the electronic device detects one or more candidate images in the one or more second images acquired through a first camera for a predetermined time in operation 1201. The candidate images may include one or more second images that are determined to be captured at an optimal photographing time point (e.g., a time point at which AF is focused) among the one or more second images. A processor of the electronic device may select one or more candidate images based on image quality of the one or more second images, brightness information of the second images, color information of the second images, composition of an external object (e.g., a subject) included in the second images, or face recognition information detected from the second images. The processor may detect at least one final candidate image by removing similar images from among the one or more candidate images. The image quality may be set based on focus information (e.g., blur) of an external object included in the second images, noise information included in the second images, or contrast information of the second images.

In operation 1203, the electronic device selects an image effect related to the one or more candidate images (or the at least one final candidate image). The processor may select an image effect to be applied to the one or more candidate images (e.g., the at least one final candidate image) based on scene information (e.g., a scene category or scene attribute) related to the second images stored in the memory. The image effect to be applied to the candidate images may be selected based on a machine-learning result based on the scene information.

In operation 1205, the electronic device determines whether to apply the image effect to the candidate images (or the final candidate image) based on the result of selecting the image effect related to the one or more candidate images (or the at least one final candidate image). When an image effect to be applied to the candidate images (or the final candidate image) is not selected, a processor of the electronic device may determine that the image effect is not applied to the candidate images (or the final candidate image). When an image effect to be applied to the candidate images (or the final candidate image) is selected, the processor may determine that the image effect is applied to the candidate images (or the final candidate image).

When it is determined that the image effect is applied to the candidate images (or the final candidate image) in operation 1205, the electronic device applies the image effect to the one or more candidate images (or the at least one final candidate image) in order to generate one or more still images in operation 1207. The processor may generate one or more still images by changing at least one of the color, transparency, style, contrast, or color of the candidate images (or the final candidate image) based on an image effect corresponding to the one or more candidate images (or the least one final candidate image).

When it is determined that the image effect is not applied to the candidate images (or the final candidate image) in operation 1205, the electronic device generates one or more still images corresponding to the one or more candidate images (or the at least one final candidate image) in operation 1209.

Figure 13:
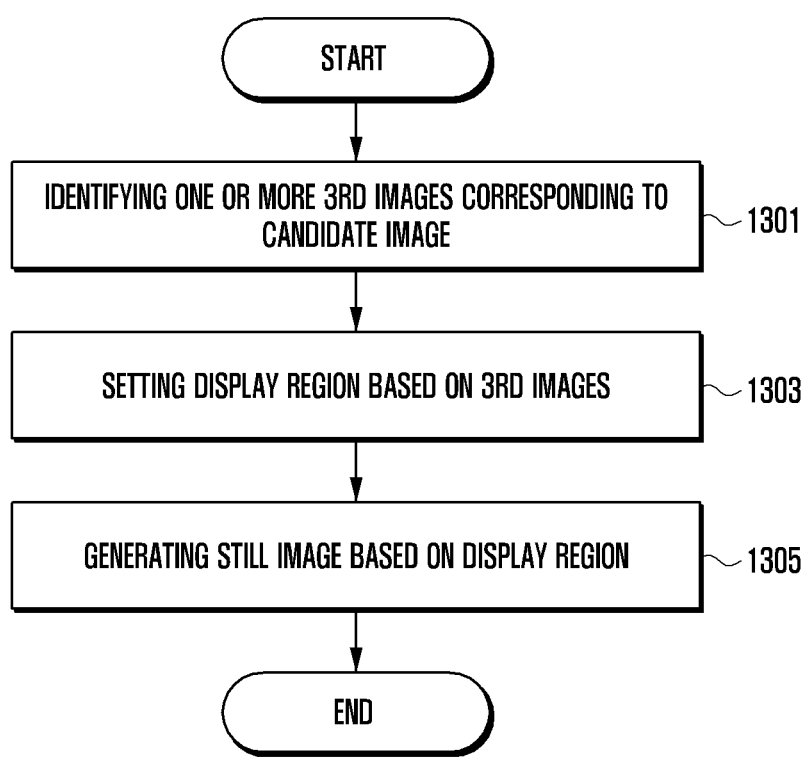
FIG. 13 is a flowchart illustrating a method for generating still images using a plurality of cameras in an electronic device according to an embodiment.

FIG. 13 is a flowchart illustrating a method for generating still images using a plurality of cameras in an electronic device according to an embodiment. According to an embodiment, the operations of FIG. 13 may correspond to an embodiment of operation 1207 or operation 1209 of FIG. 12. In the following embodiments, respective operations may be performed sequentially, but are not necessarily performed sequentially. For example, the order of operations may be changed, and at least two operations may be performed in parallel. For example, the electronic device may be the electronic device 101 in FIG. 1, the electronic device 200 in FIGS. 2A and 2B, the electronic device 220 of FIGS. 2C to 2E, or the electronic device in FIG. 3.

Referring to FIG. 13, the electronic device detects one or more third images corresponding to one or more candidate images (or at least one final candidate image) among one or more third images acquired through the second camera for a predetermined time in operation 1301. The one or more third images corresponding to the one or more candidate images (or the at least one final candidate image) may include one or more third images acquired at a capture time point, which is the same as or similar to the capture time point (e.g., a time stamp) of the candidate images (or the final candidate image). The third images having a capture point similar to that of the candidate images (or the final candidate image) may include one or more third images, which differ from the candidate images within a predetermined range in terms of difference in time information. The candidate images (or the final candidate image) may include one or more second images determined to be captured at an optimal photographing time among the one or more second images.

In operation 1303, the electronic device sets a display region for the candidate images (or the final candidate image) based on the third images corresponding to the candidate images (or the final candidate image). The display region may include one or more regions in the candidate images (or the final candidate image) for extraction or cropping in order to adjust the image magnification of the candidate images (or the final candidate image).

In operation 1305, the electronic device extracts (or crops) at least a portion of the candidate images (or the final candidate image) corresponding to the display region, and generates at least one still image based on the third images corresponding to the candidate images (or the final candidate image). When applying an image effect to a candidate image (or a final candidate image), the processor may extract (or crop) at least a portion corresponding to the display region from the candidate image (or the final candidate image) to which the image effect is applied so as to generate at least one still image.

According to an embodiment, a method is provided for operating an electronic device. (e.g., the electronic device 101 in FIG. 1, the electronic device 200 in FIGS. 2A and 2B, the electronic device 220 in FIGS. 2C, 2D, and 2E, or the electronic device in FIG. 3) The method may include an operation of acquiring a plurality of first images having a first attribute and one or more second images having a second attribute through a first camera (e.g., the camera module 180 in FIG. 1 or the camera 303 in FIG. 3) of the electronic device for a predetermined time when an input associated with image acquisition is received; an operation of generating one or more image content based on the plurality of first images or the one or more second images; and an operation of outputting the one or more image content.

The plurality of first images having the first attribute include a plurality of images acquired in a first cycle and having a first resolution, and the one or more second images having the second attribute include one or more images having a second resolution different from the first resolution.

The method may further include an operation of acquiring one or more third images having a third attribute through the second camera for the predetermined time, wherein the operation of generating the one or more image content may include an operation of generating the one or more image content based on at least one of the plurality of first images, the one or more second images, or the one or more third images.

The second camera may be configured to acquire an image related to an external environment in a direction that is the same as or different from the first camera in the housing of the electronic device.

The one or more image content may include at least one of one or more moving images generated based on the plurality of first images or one or more still images generated based on the one or more second images.

The operation of generating the one or more image content may include an operation of selecting one or more first images based on a motion image of an external object included in the plurality of first images, and an operation of generating one or more moving images based on the one or more first images.

The operation of generating the one or more image content may include an operation of detecting one or more first candidate images from among the one or more second images, an operation of detecting one or more second candidate images by removing an overlapping image from among the one or more first candidate images, an operation of selecting an image effect to be applied to the one or more second candidate images based on scene information of the one or more candidate images, and an operation of generating one or more still images by applying the selected image effect to the one or more second candidate images.

The operation of detecting the one or more first candidate images may include an operation of detecting the one or more first candidate images based on at least one of image quality of the one or more second images, brightness information of the one or more second images, a composition of an external object included in the one or more second images, or face recognition information detected from the one or more second images.

The scene information of the one or more second candidate images may include scene information detected from the one or more first images which have time information identical to time information of the one or more second candidate images from among the plurality of first images.

The operation of outputting the one or more image content may include an operation of displaying the one or more image content in different regions of one screen in a display device operatively connected to the electronic device.

The electronic device may provide various types of image content to the user by generating the various types of image content based on a single user input related to photographing.

In the above-described embodiments, although respective operations are described as being performed sequentially, these operations are not necessarily performed sequentially. For example, the order of operations may be changed, and/or at least two operations may be performed in parallel.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:
1. An electronic device, comprising:
a display;
a first camera;
a second camera;
a processor; and
memory storing instructions which, when executed by the processor, cause the electronic device to:

acquire, via the first camera, a plurality of first images of a first resolution in a first cycle, acquire, via the second camera, one or more second images of a second resolution different from the first resolution in a second cycle different from the first cycle, generate a plurality of image contents based on at least one of the plurality of first images or the one or more second images, wherein the plurality of image contents includes one or more moving images generated based on the plurality of first images and one or more still images generated based on the one or more second images, and output the plurality of image contents at respective regions of the display, wherein the instructions which, when executed by the processor, further cause the electronic device to:

detect one or more first candidate images from among the one or more second images, detect one or more second candidate images by removing an overlapping image from among the one or more first candidate images, select an image effect to be applied to the one or more second candidate images based on scene information of the one or more second candidate images, and generate the plurality of image contents including one or more still images by applying the selected image effect to the one or more second candidate images.

2. The electronic device of claim 1, wherein the instructions which, when executed by the processor, cause the electronic device to:

output a first image content among the plurality of image contents in a first region of the display and a second image content different from the first image content among the plurality of image contents in a second region different from the first region of the display.

3. The electronic device of claim 1, further comprising a housing including a first surface and a second surface facing away from the first surface, wherein the display is exposed through the first surface of the housing, wherein the first camera is configured to acquire the plurality of first images through the first surface or the second surface of the housing, and wherein the second camera is configured to acquire the one or more of second images through the first surface or the second surface of the housing.

4. The electronic device of claim 1, wherein the instructions which, when executed by the processor, cause the electronic device to:

receive an input associated with image acquisition, and in response to the received input associated with image acquisition, acquire, via the first camera, the plurality of first images, and acquire, via the second camera, the one or more second images.

5. The electronic device of claim 4, wherein the instructions which, when executed by the processor, cause the electronic device to:

in response to the received input associated with image acquisition, acquire one or more third images via the first camera, generate the plurality of image contents based on at least one of the plurality of first images, the one or more second images, or the one or more third images, and output the plurality of image contents in different regions of the display.

6. The electronic device of claim 1, wherein the instructions which, when executed by the processor, cause the electronic device to:

select one or more first images based on a motion image of an external object included in the plurality of first images, and generate the one or more moving images based on the one or more first images.

7. The electronic device of claim 1, wherein the instructions which, when executed by the processor, further cause the electronic device to:

detect the one or more first candidate images from among the one or more second images based on at least one of image quality of the one or more second images, brightness information of the one or more second images, a composition of an external object included in the one or more second images, or face recognition information detected from the one or more second images.

8. The electronic device of claim 1, wherein the instructions which, when executed by the processor, cause the electronic device to:

detect scene information from the plurality of first images, detect one or more first images having time information that is identical to time information of the one or more second candidate images from among the plurality of first images, and determine the scene information detected from the plurality of first images as the scene information of the one or more second candidate images.

9. A method of operating an electronic device, the method comprising:

acquiring, via a first camera of the electronic device, a plurality of first images of a first resolution in a first cycle;

acquiring, via a second camera of the electronic device, one or more second images of a second resolution different from the first resolution in a second cycle different from the first cycle;

generating a plurality of image contents based on at least one of the plurality of first images or the one or more second images, wherein the plurality of image contents includes one or more moving images generated based on the plurality of first images and one or more still images generated based on the one or more second images; and outputting the plurality of image contents at respective regions of a display of the electronic device, wherein generating the plurality of image contents comprises:

detecting one or more first candidate images from among the one or more second images;

detecting one or more second candidate images by removing an overlapping image from among the one or more first candidate images;

selecting an image effect to be applied to the one or more second candidate images based on scene information of the one or more second candidate images; and generating one or more still images by applying the selected image effect to the one or more second candidate images.

10. The method of claim 9, wherein acquiring the plurality of first images comprises:

receiving an input associated with image acquisition; and in response to the received input associated with image acquisition, acquiring, via the first camera, the plurality of first images for a predetermined time.

11. The method of claim 10, wherein acquiring the one or more second images comprises:
    in response to the received input associated with image acquisition, acquiring, via the second camera, the one or more second images for the predetermined time.

12. The method of claim 11, further comprising acquiring one or more third images via the first camera for the predetermined time, in response to the received input associated with image acquisition,
    wherein generating the plurality of image contents comprises generating the one or more image content based on at least one of the plurality of first images, the one or more second images, or the one or more third images.

13. The method of claim 9, wherein generating the plurality of image contents comprises:
    selecting one or more first images based on a motion image of an external object included in the plurality of first images; and
    generating the one or more moving images based on the one or more first images.

14. The method of claim 9, wherein detecting the one or more first candidate images comprises:
    detecting the one or more first candidate images based on at least one of image quality of the one or more second images, brightness information of the one or more second images, a composition of an external object included in the one or more second images, or face recognition information detected from the one or more second images.

\* \* \* \* \*